US 9,258,250 B2

(12) United States Patent
Shettel

(10) Patent No.: US 9,258,250 B2
(45) Date of Patent: Feb. 9, 2016

(54) DYNAMIC DATA CHANNEL SCHEDULING

(75) Inventor: Michael James Shettel, Louisville, CO (US)

(73) Assignee: QUALCOMM Incorporated, San Diego, CA (US)

( * ) Notice: Subject to any disclaimer, the term of this patent is extended or adjusted under 35 U.S.C. 154(b) by 886 days.

(21) Appl. No.: 13/444,658

(22) Filed: Apr. 11, 2012

(65) Prior Publication Data

US 2013/0100962 A1   Apr. 25, 2013

Related U.S. Application Data

(60) Provisional application No. 61/475,534, filed on Apr. 14, 2011.

(51) Int. Cl.
*H04L 12/911* (2013.01)
*G06F 13/372* (2006.01)

(52) U.S. Cl.
CPC .............. *H04L 47/72* (2013.01); *G06F 13/372* (2013.01)

(58) Field of Classification Search
None
See application file for complete search history.

(56) References Cited

U.S. PATENT DOCUMENTS

| 5,784,569 | A | 7/1998 | Miller et al. |
| 2005/0184781 | A1* | 8/2005 | Nagasue ................. 327/175 |
| 2008/0219236 | A1* | 9/2008 | Love et al. ............. 370/347 |
| 2010/0226268 | A1* | 9/2010 | Tao et al. ............... 370/252 |

OTHER PUBLICATIONS

Backman et al, SLIMbus™:An Audio, Data and Control Interface for Mobile Devices, AES 29th International Conference, Seoul, Korea, Sep. 2-4, 2006.*
Nuno et al, A New Polling-based Dynamic Slot Assignment Scheme for Broadband Wireless Access Systems, Mobile Multimedia Communications, 1999. (MoMuC '99) 1999 IEEE International Workshop, pp. 318-327, Print ISBN: 0-7803-5904-6.*
International Search Report and Written Opinion—PCT/US2012/033393—ISA/EPO—Sep. 27, 2012.
Juha B., et al.,"Slimbus: An Audio, Data and Control Interface for Mobile Devices" Conference: 29th International Conference: Audio for Mobile and Handheld Devices; Sep. 2006, AES, 60 East 42nd Street, Room 2520 New York 10165-2520, USA, Sep. 1, 2006, XP040507958 Section 2.6.

* cited by examiner

*Primary Examiner* — Jeffrey M Rutkowski
*Assistant Examiner* — Andre Tacdiran
(74) *Attorney, Agent, or Firm* — Howard Seo

(57) ABSTRACT

Data channels are sorted into an order in terms of an exponent E, where E is defined in the equation: segment interval=$C*2^E$, in which segment interval is a number of the slots between instances of a given data channel, and the data channels are assigned to ones of the slots in terms of the order. Subsequent to the assigning data channels, the control channel is assigned to ones of the slots on the data line. Optionally assigning the data channels assigns all data channels to ones of the slots on the data line to reduce the number of unassigned slots.

12 Claims, 18 Drawing Sheets

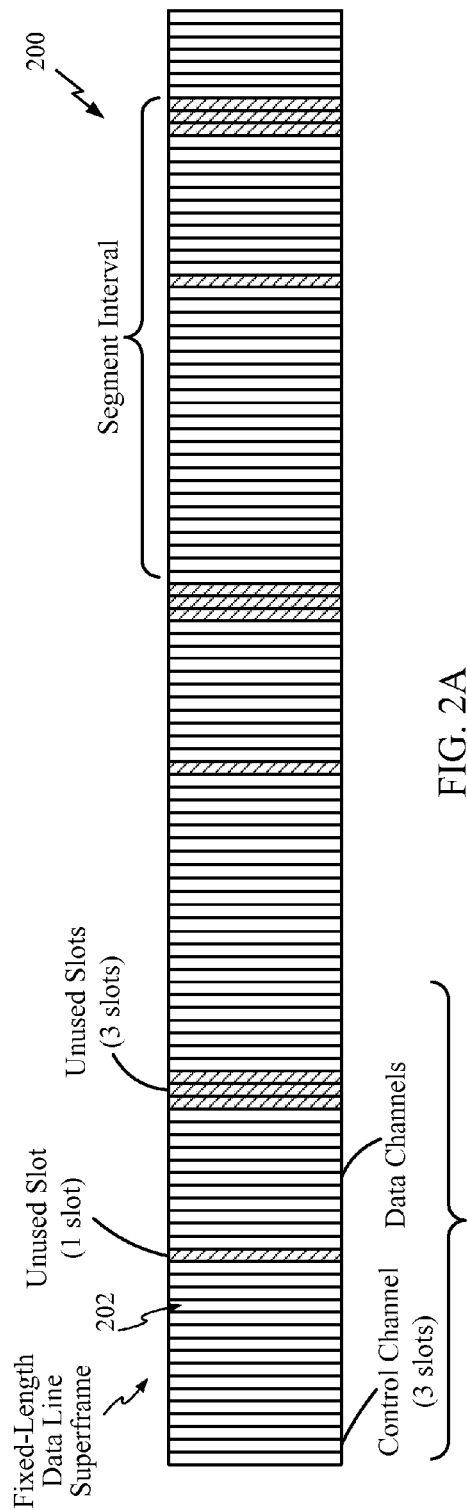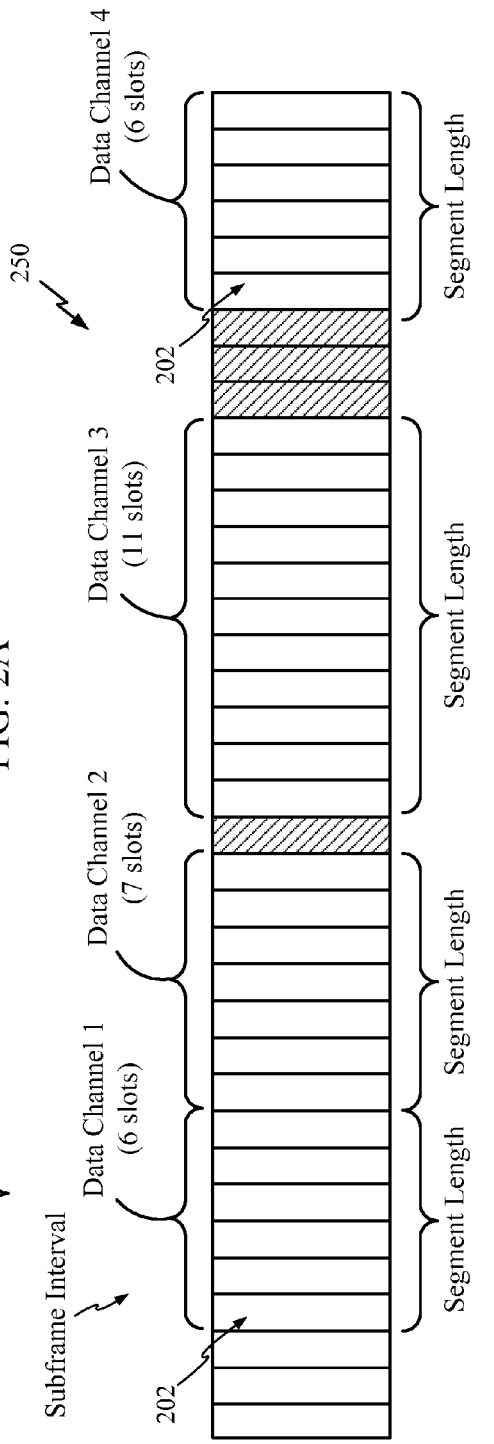
FIG. 2A
FIG. 2B

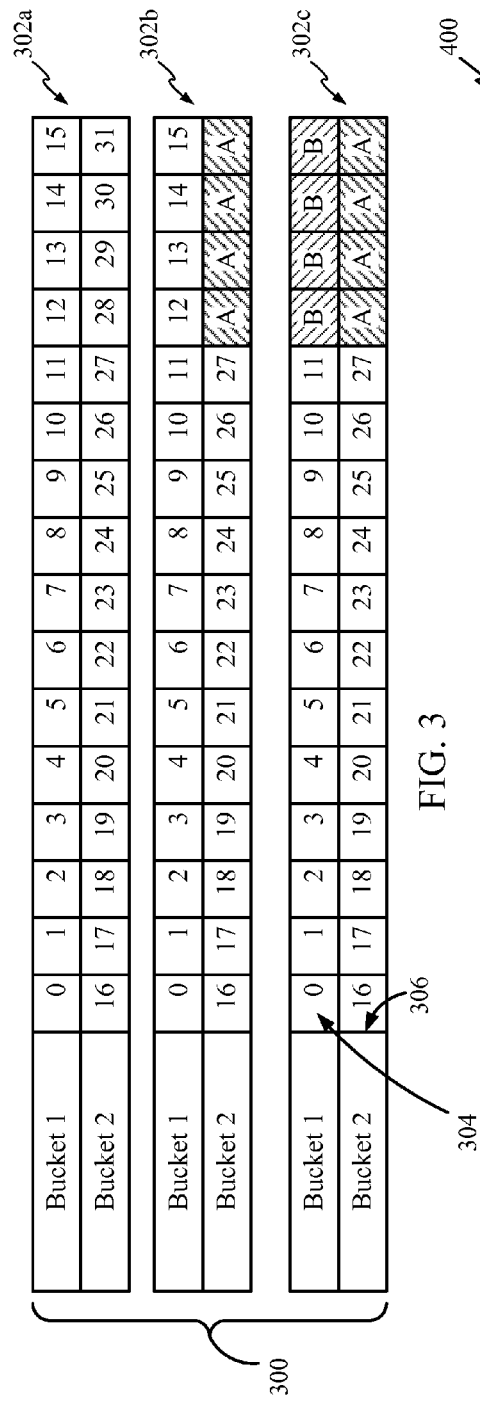
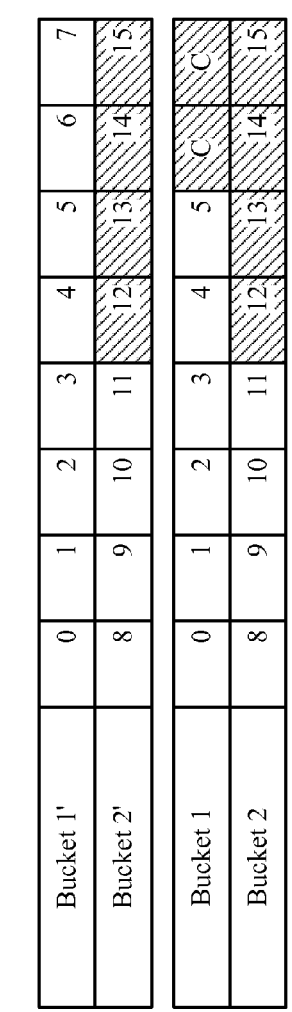
FIG. 3
FIG. 4
FIG. 5

FIG. 12A

| Offset | 0 | 1 | 2 | 3 | 4 | 5 | 6 | 7 | 8 | 9 | 10 | 11 | |
|---|---|---|---|---|---|---|---|---|---|---|---|---|---|
| Bucket 1' | 0 | 1 | 2 | 3 | 4 | 5 | 6 | 7 | DATA CH 1212 | | | | |
| Bucket 2' | 12 | 13 | 14 | 15 | 16 | 17 | 18 | 19 | 20 | 21 | 22 | 23 | 1210a |
| Bucket 1' | 24 | 25 | 26 | 27 | 28 | 29 | 30 | 31 | DATA CH 1214 | | | | |
| Bucket 2' | 36 | 37 | 38 | 39 | 40 | 41 | 42 | 43 | 44 | 45 | 46 | 47 | |

| | | | | | | | | | | | | |
|---|---|---|---|---|---|---|---|---|---|---|---|---|
| 0 | 1 | 2 | 3 | 4 | 5 | 6 | 7 | DATA CH 1216 | | | | |
| 12 | 13 | 14 | 15 | 16 | 17 | 18 | 19 | 20 | 21 | 22 | 23 | 1210b |
| 24 | 25 | 26 | 27 | 28 | 29 | 30 | 31 | DATA CH 1216 | | | | |
| 36 | 37 | 38 | 39 | 40 | 41 | 42 | 43 | 44 | 45 | 46 | 47 | |

| | | | | | | | | | |
|---|---|---|---|---|---|---|---|---|---|
| 0 | 1 | 2 | 3 | 4 | 5 | 6 | 7 | DATA CH 1212 | |
| 12 | 13 | 14 | 15 | 16 | 17 | 18 | 19 | DATA CH 1216 | 1210c |
| 24 | 25 | 26 | 27 | 28 | 29 | 30 | 31 | DATA CH 1214 | |
| 36 | 37 | 38 | 39 | 40 | 41 | 42 | 43 | DATA CH 1216 | |

¼ Segment Interval

FIG. 12B

| Offset | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| | 0 | 1 | 2 | 3 | 4 | 5 | 6 | 7 | DATA CH 1212 | | | | 12 | 13 | 14 | 15 | 16 | 17 | 18 | 19 | DATA CH 1216 | | | |
| | 24 | 25 | 26 | 27 | 28 | 29 | 30 | 31 | DATA CH 1214 | | | | 36 | 37 | 38 | 39 | 40 | 41 | 42 | 43 | DATA CH 1216 | | | |
| | 48 | 49 | 50 | 51 | 52 | 53 | 54 | 55 | DATA CH 1212 | | | | 60 | 61 | 62 | 63 | 64 | 65 | 66 | 67 | DATA CH 1216 | | | |
| | 72 | 73 | 74 | 75 | 76 | 77 | 78 | 79 | DATA CH 1214 | | | | 84 | 85 | 86 | 87 | 88 | 89 | 90 | 91 | DATA CH 1216 | | | |

Bucket 1'  Bucket 1'  Bucket 2'  Bucket 2'

DYNAMIC DATA CHANNEL SCHEDULING

CLAIM OF PRIORITY UNDER 35 U.S.C. §119

The present Application for Patent claims priority to Provisional Application No. 61/475,534 entitled "Dynamic Data Channel Scheduling," filed Apr. 14, 2011, and assigned to the assignee hereof and hereby expressly incorporated by reference herein

FIELD OF THE INVENTION

The present invention relates to computing devices. In particular, but not by way of limitation, the present invention relates to apparatus and methods for scheduling data channels on a data line.

BACKGROUND OF THE INVENTION

Time-division multiplexing can be used for scheduling one or more data channels (for transferring data) and control channels (for transferring control information and messages) periodically on a data line. Data channels are periodic time periods in which certain data is transmitted on the data line. Each data channel can include multiple slots, with each slot comprising multiple bits. Data channels can have different lengths, with and the length can be measured in units of bits or slots, where a slot can comprise multiple bits. The period between each instance of a data channel can be called a "segment interval"

Scheduling a data line with control and data channels using conventional time-division multiplexing techniques can involve use of lookup tables to determine where channels can be assigned. This can be resource intensive, and in some applications can present design and implementation challenges. The design and implementation challenges that can be associated with these conventional scheduling techniques can arise in various applications, for example making a data line compatible with the Serial Low-Power Inter-Chip Media Bus (SLIMBUS). SLIMBUS is a standard defining communications between baseband or application processors and peripheral components in mobile terminals. The SLIMBUS standard is intended to accommodate simultaneous access of multiple digital audio devices to a single two-line bus, and its contemplated benefits include, for example, reducing pin count, package size, printed circuit board (PCB) layout area, and/or power consumption.

Among factors that can complicate design and implementation issues and challenges that may be associated with SLIMBUS, and possibly other present or future standards, is that the standard establishes interfaces and protocols for a data and clock line in terms of a physical layer, framer layer, interface device, manager device, framer device, and various other devices that will be collectively referenced as "generic devices." However, SLIMBUS omits, and perhaps other future standards similarly omit, description of software instructions for configuring general purpose programmable processors to perform in accordance with the standard. For example, the SLIMBUS standard does not specify software instructions, or processing logic flow sufficiently to readily map to software instructions, for various tasks required to meet the standard. Examples of such tasks can include, without limitation, allocating data and control channels within a superframe of the data line.

SUMMARY

An embodiment can provide scheduling of data channels and a control channel on a data line having a limited number of slots to reduce a number of the slots that are unassigned, and in various aspects can include sorting data channels into an order in terms of an exponent E, where E is defined in the equation of: segment interval=$C*2^E$, where segment interval is a number of the slots between instances of a given data channel, and in one aspect can further include assigning data channels to respective ones of the slots in terms of the order, wherein the assigning assigns all data channels to respective ones of the slots on the data line to reduce the number of the slots that are unassigned. An embodiment can include, in another aspect, assigning a control channel to slots on the data line to reduce the number of the slots that are unassigned, and wherein the assigning a control channel is subsequent to the assigning data channels.

An embodiment can include a data line having a limited number of slots per unit time and configured to propagate a plurality of data channels in one or more of the slots that are contiguous, and can further include a control channel in one or more of the slots that are contiguous, a clock line, a data channel slot selector that selects one or more contiguous slots for each of the plurality of data channels until none of the plurality of data channels overlap and a number of unused slots is reduced, and a control channel slot selector that selects one or more contiguous slots for the control channel until the control channel does not overlap with itself or overlap any of the plurality of data channels and the number of unused slots is reduced, wherein the selecting control channel slots is subsequent to the selecting data channel slots.

In one aspect, an example apparatus according to one embodiment can further include a clock frequency selector that passes a clock signal related to a reference frequency as $1/(2^N)$ where N is a range that can include zero and positive integers.

An apparatus according to one embodiment can include means for sorting data channels into an order for scheduling on a data line in terms of an exponent E, where in an aspect E can be defined in the equation: segment interval=$C*(2^E)$ and, in a further aspect, the segment interval can be a number of the slots between instances of a given data channel, and can further include means for assigning data channels to respective ones of the slots in terms of the order, wherein the assigning assigns all data channels to respective ones of the slots on the data line to reduce the number of the slots that are unassigned, and means for assigning a control channel to slots on the data line to reduce the number of the slots that are unassigned, and wherein the assigning a control channel is subsequent to the assigning data channels.

Various non-transitory, tangible computer readable storage media according to an embodiment can be encoded with processor readable instructions to schedule data channels and a control channel on a time-division multiplexed single-line data bus, for example to reduce a number of the slots that are unassigned, and according to various aspects the methods can include or can perform sorting data channels into an order in terms of an exponent E, where according to one aspect E can be defined in the equation: segment interval=$C*2^E$, where segment interval can be a number of the slots between instances of a given data channel, and, in another aspect, can include assigning data channels to respective ones of the slots in terms of the order, wherein the assigning assigns all data channels to respective ones of the slots on the data line to reduce the number of the slots that are unassigned, and in a further aspect can include assigning a control channel to slots on the data line to reduce the number of the slots that are unassigned, and wherein the assigning a control channel can be subsequent to the assigning data channels.

Methods according to one or more embodiments can provide scheduling data channels and a control channel on a single-line data bus, and in various aspects can include sorting two or more data channels into an ordered set of data channels in order of exponent E from highest to lowest, where in an aspect exponent E can be defined by the equation: segment interval=$C*2^E$, and where in a further aspect the segment interval can be a number of the slots between instances of a given data channel, and in a further aspect the coefficient C can be a constant without factors of 2, and an example method according to these one or more exemplary embodiments can further include determining a target length and a target quantity for each of the two or more data channels, and assigning the data channels in the ordered set of data channels to respective ones of the slots on the data line based on the target length and the target quantity, to reduce a number of the slots that are unassigned, and can further include assigning a control channel to slots on the data line to reduce a number of the slots that are unassigned.

A method according to an embodiment can comprise for each data channel in the ordered set of data channels, a target length and a target quantity for buckets can be assigned according to the following process: (1) if a bucket length is greater than or equal to the segment interval, and the coefficient C is greater than 1, then setting the target length equal to $(2^E)/(2^e)$ where e is any positive integer or zero, and setting the target quantity equal to the segment interval divided by the target length; (2) if the bucket length is greater than or equal to the segment interval and the coefficient C is equal to 1, then setting the target length equal to $(2^E)/(2^e)$ where e is any positive integer, and setting the target quantity equal to the segment interval divided by the target length; (3) if the bucket length is less than the segment interval but greater than or equal to $(2^E)$, then setting the target length equal to $(2^E)/(2^e)$ where e is any positive integer or zero, and setting the target quantity equal to the segment interval divided by target length; and (4) if the bucket length is less than segment interval and less than $(2^E)$, then setting the target length equal to the bucket length divided by $(2^e)$ where e is any positive integer or zero, and setting the target quantity equal to the segment interval divided by the target length.

A method according to an embodiment can include assigning data channels in the ordered set of data channels to slots and assigning an offset, for each data channel in the ordered set of data channels, in accordance with the assigning of (1) a first largest offset within the buckets if the target length is equal to the bucket length and if the target quantity is equal to a bucket quantity; (2) a second largest offset within the buckets, where the second largest offset excludes gaps, and where the bucket quantity is reduced to the target quantity, if the target length is equal to bucket length and the target quantity is less than the bucket quantity; (3) a first largest offset within the buckets, wherein the bucket quantity is increased to the target quantity, if the target length equals the bucket length, if the target quantity is greater than the bucket quantity, and if the target quantity is an integer multiple of the bucket quantity; (4) a second largest offset within the buckets, where the second largest offset excludes gaps, and where the bucket quantity is increased to the target quantity, if the target length equals the bucket length, and the target quantity is not an integer multiple of the bucket quantity; and (5) a second largest offset within the buckets, where the second largest offset excludes gaps, and where the bucket quantity is increased or decreased as necessary to equal the target quantity, and where the bucket length is halved repeatedly until the bucket length is equal to the target length, if the target length is less than the bucket length.

BRIEF DESCRIPTION OF THE DRAWINGS

The accompanying drawings found in the attachments are presented to aid in the description of embodiments of the invention and are provided solely for illustration of the embodiments and not limitation thereof.

FIG. 2a shows one example fixed-length data line superframe, with an example segment interval.

FIG. 2b shows an expanded view of an example portion of the FIG. 2a example superframe.

FIG. 3 shows iterations of assigning two channels to slots as buckets formed in accordance with an embodiment.

FIG. 4 shows one example forming of buckets from unused slots after the FIG. 3 iterations, in accordance with an embodiment.

FIG. 5 shows one example iteration of assigning another channel to slots of the FIG. 4 example formed new buckets, in accordance with an embodiment.

FIG. 12a illustrates one aspect in a process for assigning data channel slots in accordance with an embodiment.

FIG. 12b illustrates one example of assigning a data channel to slots that are, in one aspect, one half segment interval apart from a virtual channel, in accordance with an embodiment.

FIG. 12c illustrates a data line with slots assigned to first, second, and third data channels, in accordance with an embodiment.

FIG. 13 illustrates gaps that form when two data channels having equivalent segment intervals and unequal segment length are assigned, in accordance with an embodiment, slots one half segment interval apart.

FIG. 14 shows a combining into a single virtual data channel multiple data channels all having the same segment interval, in accordance with an embodiment.

DETAILED DESCRIPTION

Figure 1:
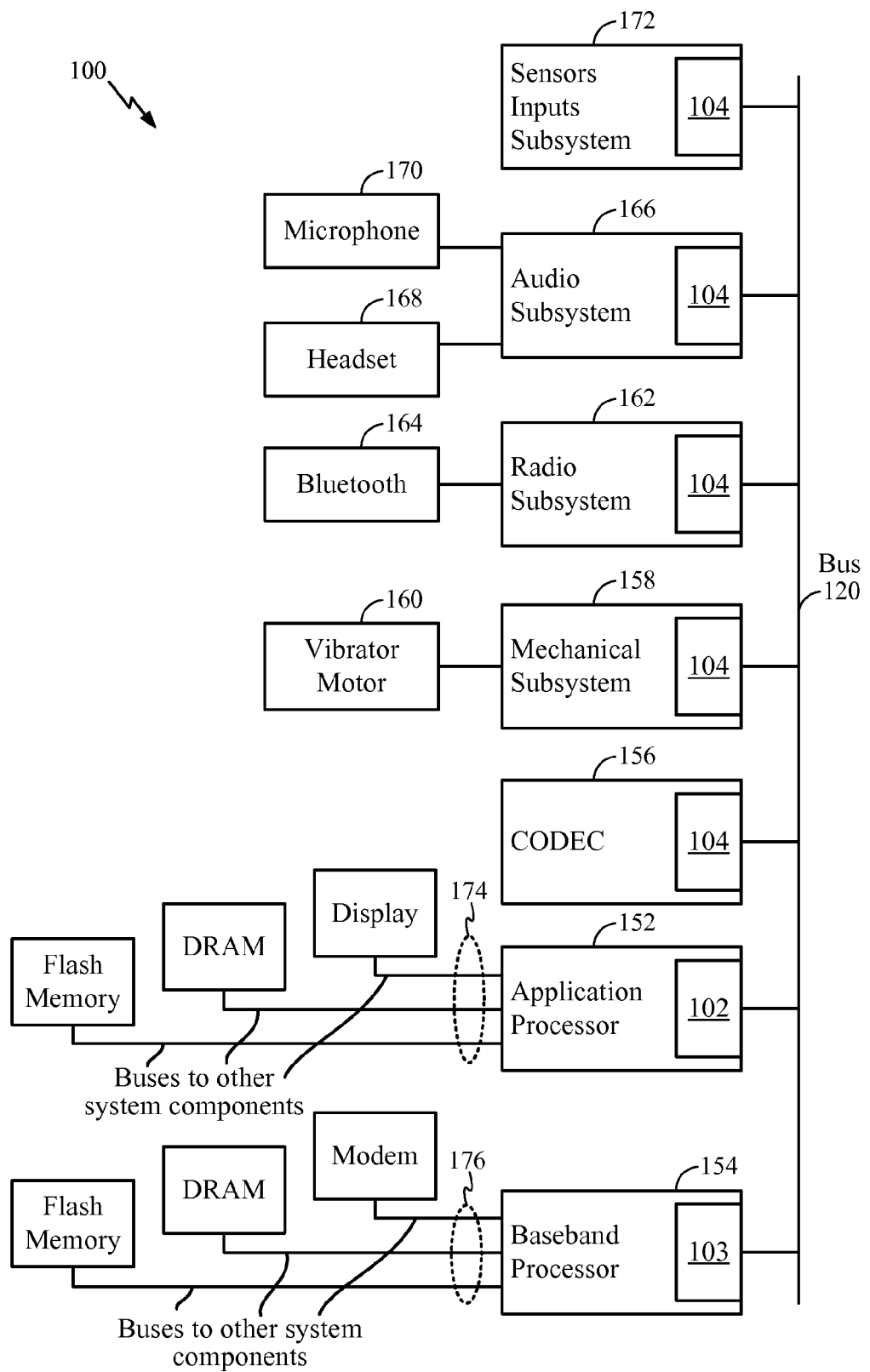
FIG. 1 illustrates one example computing environment 100 in which various exemplary embodiments can be supported.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields, electron spins particles, electrospins, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

This disclosure describes, among other embodiments, a data interface configured to schedule data channels and a control channel on a data line of a bus via time-division multiplexing (TDM) in order to reduce or minimize a number of unused slots in a fixed-length data line superframe (hereinafter referred to as a "superframe"). The apparatus and method herein described are applicable to a variety of data communications protocols, including, for instance, SLIMBUS.

A superframe is an organizational construct used to delineate portions of data and control information on a data line. A superframe has a fixed number of slots and each slot contains a fixed number of bits (e.g., four bits per slot and 1536 slots per superframe). A data interface coupled to the bus can iteratively select slots within the superframe to assign to data channels. This iterative process continues until the data interface finds a set of slot assignments in which no data channels overlap and all data channels fit within the superframe. The iterative process also can reduce, or minimize the number of unused slots—in other words there is an optimization of slot usage. This may involve decreasing a clock frequency or clock gear until data and/or control channels cannot fit within a superframe, and then increasing the clock frequency by a unit of clock frequency (e.g., doubling the clock frequency) in order to allow all data and control channels to be scheduled within the superframe.

Once data channels have been assigned slots, the data interface can iteratively select slots for a control channel within the superframe. This iterative process continues until the device interface finds a set of control channel slot assignments in which the control channel does not overlap with itself or the data channel. The iterative process can also reduce, or minimize the number of unused slots—in other words there is an optimization of slot usage by control channels. This may involve decreasing a clock frequency or clock gear and then continuing the iterative process in order to allow the control channel and all the data channels to fit within the superframe. If there are insufficient slots to assign the control channel, then the process returns to the iterative selection of data channel slots or increases the clock frequency and then again iteratively selects data channel slots.

In an embodiment, when data channels are added or removed from a set of data channels to be transmitted on the data line, the algorithm restarts and schedules the entire set of data channels.

The advantage of such an iterative process is that data and control channels can be scheduled on a data line via TDM in a dynamic and adaptive fashion. In contrast, other methods of scheduling data and control channels often use pre-assigned slots, or determine slot assignments based on a lookup table. These approaches may involve human maintenance, use up valuable memory, and be inflexible.

FIG. 1 illustrates one computing environment 100 in which various exemplary embodiments can be supported. As will be described in greater detail at later section, the computing environment 100 can include a data interface 102 that can schedule or assign data channels and the control channel on a bus data line 120 to an application processor 152. The example data interface 103 can schedule or assign data channels and the control channel on the bus data line 120 for baseband processor 154.

With continuing reference to FIG. 1, one example of a computing environment 100 can include among the other devices and subsystems a coder/decoder (CODEC) 156 coupled to the bus data line 120 by one instance of what will be termed a generic interface 104, described in greater detail below, and can include an acoustic or other mechanical subsystem 158 with, for example, an associated vibrator device or vibrator motor 160 and coupled to the bus data line by another generic interface 104. Referring still to FIG. 1, one example of the computing environment 100 can include a radio subsystem 162 with an associated Bluetooth subsystem 164, coupled to the bus data line by another generic interface 104. In one example, the computing environment 100 can include an audio subsystem 166 with an associated headset or headset plug 168 and an associated microphone or external microphone plug 170. In one example the computing environment 100 can include a sensor inputs subsystem 172, also coupled to the bus data line 120 by another generic interface 104.

Referring still to FIG. 1, one example of the computing environment 100 can further include various buses, collectively labeled 174, coupling the application processor 152 to other system components such as flash memory, DRAM and a display. Similarly, an example of the computing environment 100 can include various buses, collectively labeled 176, coupling the baseband processor 154 to other system components such as flash memory, DRAM and a display.

Referring still to FIG. 1, it will be understood that the relative size and arrangement of the graphical blocks representing the computing environment 100 are for graphical clarity, and are not intended to represent any spatial arrangement of hardware, or any similarity or difference between hardware and computer executable instructions that can implement the functions represented by the various blocks, or any relative importance or any relative order of computational burden or requirements associated with the various blocks.

FIG. 2a shows one example fixed-length data line superframe 200, with an example segment interval and FIG. 2b shows an expanded view of an example portion, r referenced herein as a "subframe interval" 250 of the FIG. 2a example superframe. It will be understood that FIGS. 2a and 2b are not intended to represent a preferred structure of the superframe and, instead, are provided as visual aids that may be referenced while forming a clear understanding of various terms used in the more detailed description below of example processes in accordance with various exemplary embodiments.

Referring to FIG. 2a, the superframe 200 can have a fixed number of slots, generically labeled 202, and it will be understood that each slot 202 can contain a quantity of bits (not explicitly shown) (e.g., four bits per a SLIMBUS-compatible data line). The superframe 200 can be understood as a snapshot with respect to slots being presently "used," which for purposes of this description will mean being assigned to a channel, or "unused," which for purposes of this description will mean not currently assigned to a channel. It will be appreciated that the status of a slot with respect to being used or unused, is dynamic. In the snapshot represented by FIG. 2a, and the expanded view of the subframe interval 250 shown in FIG. 2b, unused slots are marked in cross-hatch.

FIG. 2b, as stated above, shows an expanded view of a portion of the FIG. 2a superframe 200. Referring to FIG. 2b, the subframe interval 250 can have one or more data channels, as exemplified by Data Channels 1, 2, 3, and 4, with each data channel having a span of slots, referenced herein as the "segment length." With respect to the quantity of data channels, the FIG. 2b example shows four, but four is an arbitrary example and is not intended to limit the scope of any of the embodiments. Referring still to FIG. 2b, example Data Channels 1 and 4 are shown as each having a segment length of six slots, while Data Channel 2 is shown with a segment length of seven slots, and Data Channel 3 is shown with a segment length of 11 slots. It will be understood that these respective example segment lengths for Data Channels 1, 2, 3 and 4 are arbitrary, and are not intended to limit the scope of any exemplary embodiments.

In an aspect, data channels, such as Data Channel 1, 2, 3 and 4 can be assigned slots such that instances of each of these periodically repeat throughout the superframe 200. This periodicity, or the slot spacing between instances of a data channel, will be called a "segment interval."

In accordance with an embodiment, the frequency or periodicity of a data channel, such as the FIG. 2B Data Channels 1, 2, 3, and 4 can be defined as:

$$\text{Segment Interval} = C * 2^E \qquad \text{(Equation 1)}$$

where C is a constant without any factors of 2 (cannot be divided by 2), and E is an integer in the set 0 to infinity. FIG. 2a illustrates approximately 120 slots in the superframe 200. However, 120 slots is only an example and is not intended to limit the scope of any embodiments, as it will be understood that any number of slots can exist within a superframe.

Referring to FIG. 2a, the superframe 200 can include a control channel, and in the depicted example, the control channel is three slots in length. The control channel repeats periodically after a fixed number of slots. The number of slots separating each instance of the control channel is referred to herein as a "subframe interval." In the FIG. 2a example, the superframe 200 is three times the subframe interval. The subframe interval and segment interval need not be equal; however in an aspect they can be selected to be related such that data channels and the control channel do not overlap. As one example, the subframe interval could be twice as long as the segment interval. In the illustrated embodiment, the subframe interval and the segment interval are equal but, as previously described, this need not be the case.

In an embodiment, a "base segment interval" can be defined as $2^E$. When all data channels have the same coefficient C, the base segment interval can be defined as the segment interval. In an aspect, for each data channel, a "bucket interval" can be defined as the data channel's base segment interval divided by $2^e$, where e is either a positive integer or zero, such that the data channel's base segment interval is evenly divided by the power of 2.

Stated differently, the bucket interval can be defined as:

$$\text{bucket interval} = \text{base segment interval}/(2^e).$$

The bucket interval, in one aspect, can preferably be chosen to be less than the segment interval of the data channel.

For each data channel, a bucket quantity, B, can be defined as the data channel's segment interval divided by the bucket interval.

FIG. 3 shows a high level data channel assignment sequence 300, of example data channels "A" and "B" into a 32 slot segment interval in according to various exemplary embodiments. The channel assignment state 302a shows all 32 slots unused. The assignment state 302a also shows, in accordance with an embodiment, the 32 slot segment interval in a logical arrangement of two "buckets," Bucket 1 and Bucket 2, each having a bucket length of 16 slots. Channel assignment state 302b shows a data channel assignment, or scheduling, in assigning data channel A to a position, termed herein as a "segment offset," of 28 slots from the segment interval start 304. This corresponds to a position within Bucket 2 that is offset 12 slots from the beginning Bucket 2 beginning slot 306. This position of channel A can be referred to as a "bucket offset" of 12 slots within Bucket 2. This segment offset of 28 (or bucket offset of 12 relative to Bucket 2) leaves 12 unused slots in Bucket 2. In another aspect these 12 unused slots in Bucket 2 can be used to construct new buckets having shorter lengths than Buckets 1 and 2, as described in greater detail at later sections. In a related aspect, channel assignment state 302c shows a data channel assignment of data channel B, a segment offset 12, which can also be viewed as a bucket offset of 12 in Bucket 1, also leaving 12 unused slots in Bucket 1.

Referring still to FIG. 3, as will be described in greater detail at later sections, in an aspect of data and control channel assignment according to an embodiment, an ordering and grouping of data channels can be performed prior to the assignment process. Further to the aspect, the grouping can include grouping channels having the same length, such as the example data channels "A" and "B," each having a segment length of four slots.

Referring to FIG. 4, an updated construction 400 of buckets is shown, breaking each of Buckets 1 and 2 into two constituent buckets, labeled Bucket 1' and Bucket 2'.

FIG. 5, shows one example channel assignment state 502, on a reconstruction of the FIG. 4 buckets now having four buckets, labeled Bucket 1, Bucket 2, Bucket 1' and Bucket 2'. Buckets 2 and 2' have bucket length of eight slots and each have four unused slots. Buckets 1 and 1' have a bucket length of eight slots and have six and eight unused slots, respectively. The channel assignment 502 shows another data channel, labeled "C," assigned at a bucket offset of six in Bucket 1. It should be noted that Data Channel "C" was assigned, as will be described in greater detail at later sections, in one of the buckets having more unused slots, as opposed to one of the buckets having less unused slots.

Figure 6:
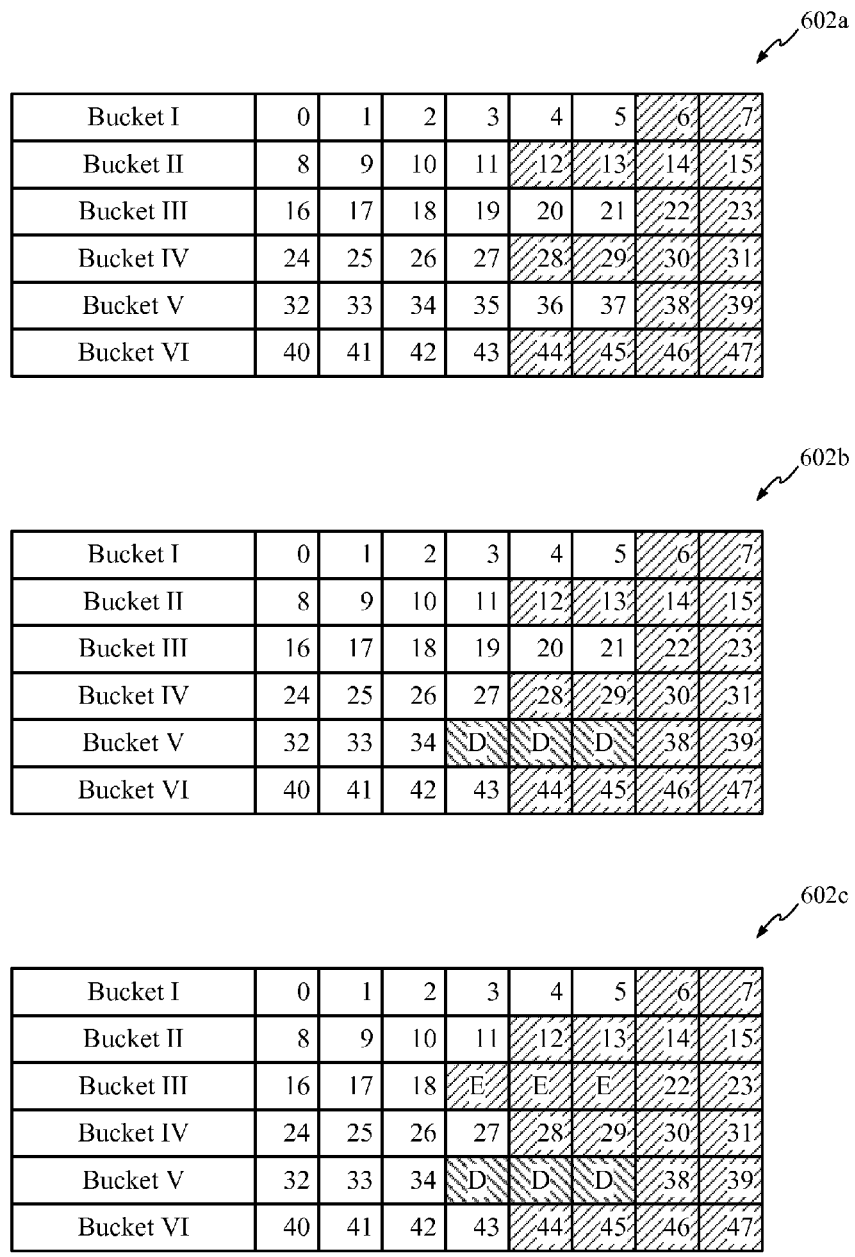
FIG. 6 shows iterations of assigning channels to one example plurality of buckets formed through iterations, in accordance with an embodiment.

FIG. 6 shows a succession of channel assignment states, labeled 602a, 602b and 602c, in an example process according to an embodiment. Referring to data channel assignment state 602a, there are six buckets, all formed with eight slots, with Buckets I, III and V having two used slots, and Buckets II, IV and VI having a bucket offset of four used slots. In terms of bucket offset or unused slots, Buckets I, III and V have a bucket offset of six and therefore six unused slots, while Buckets II, IV and VI have a bucket offset of four, meaning only four unused slots. For purposes of example, assume that two additional channels, labeled for this example as data channel "D" and data channel "E," have arrived for scheduling, each having a segment length of three slots. Referring to channel assignment states 602b and 602c, one example process according to an embodiment assigns data channels "D" and "E," successively, to Buckets V and III, which are buckets having the largest number of unused slots.

Figure 7:
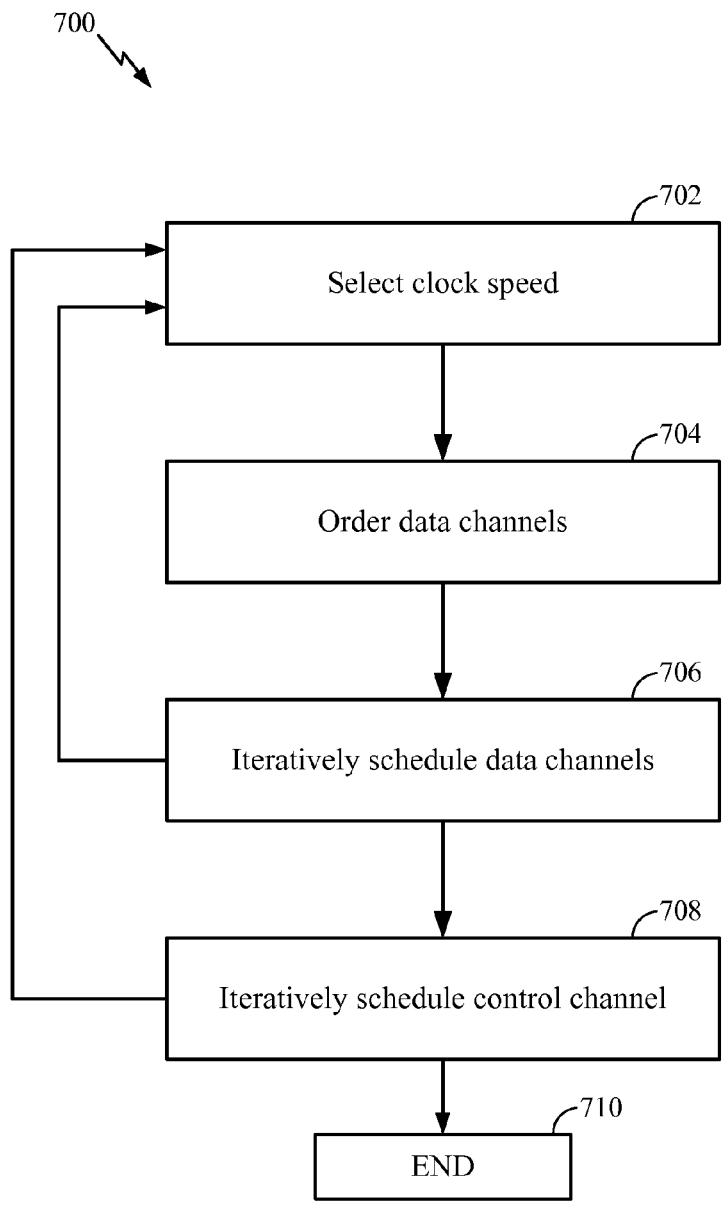
FIG. 7 shows a logical flow schematic of one example dynamic data channel assignment in accordance with an embodiment.

FIG. 7 is a logic flow schematic of one process 700 in assigning data channels and a control channel in accordance with an embodiment, on a data line having a limited number of slots to reduce a number of unused slots. The method 700 can include a select current clock speed (or clock gear) operation 702. It will be understood that the select current clock speed operation 702 can be optional, as embodiments contemplate using a given clock speed, for example received from a source (not shown) external to process 700. In one aspect, the select current clock speed operation 702 can select a clock frequency related as $\frac{1}{2}^N$ to a reference clock frequency, where N consists of a range of positive integers and zero. In a further aspect, the select current clock speed operation 702 can select a first clock frequency to coincide with the reference clock frequency (e.g., N=0), and then the order or sort process operation 704, data channel assign operation 706 and control channel assign operation 708, described in greater detail below, can follow.

As shown at FIG. 7, and as described in greater detail below, in one aspect if either of the data channel assign operation 706 and control channel assign operation 708 fail, meaning there are remaining unassigned channels, the process 700 can increase the clock frequency and then another iteration of the assign operation channel assign operation 706 and control channel assign operation 708 can be performed. In an aspect the select clock speed operation 702 can begin with an estimated clock speed that, on average, allows all data channels and a control channel to be scheduled, but is also the slowest clock speed capable of this goal in order to conserve power (e.g., slower clock frequency means less electrical power consumption). In an aspect, an estimating of clock speed at 702 can include adding the total segment lengths of all data channels and the control channel that are to be scheduled. If this sum is greater than the number of slots available at a given clock speed, then the select clock speed operation 702 can increase the clock speed (or clock gear).

It will be understood that the aspect repeating another iteration of the data channel assign operation 706 and control channel assign operation 708 is optional, but if performed can reduce (or minimize) a number of unused or unassigned slots.

Referring still to FIG. 7, in an aspect, the process 700 can go to a data channel ordering operation 704, where data channels can be ordered (or grouped or preprocessed) to determine an order or priority data channels are to be assigned slots. In the data channel ordering operation 704, an order of data channels can be created in terms of exponent E (see equation 1) from high to low, meaning data channels with the largest E will be scheduled first. Optionally, data channels can be further ordered in terms of coefficient C (either high to low or low to high). In an aspect, the data channel ordering operation 704 can include computing, for each data channel, a segment interval based on the selected clock speed (and/or clock gear), and expressing, for each data channel, the channel's segment interval as a coefficient C multiplied by 2 to the power of E, where the coefficient C does not have factors of 2 (it cannot be evenly divided by 2) (e.g., segment interval=C* $(2^E)$.

Referring still to FIG. 7, in an aspect, one example process according to the channel scheduling preprocessing 700, after sorting the data channel groups at 706 in order of decreasing exponent E values, can at 708 sort channels by their coefficient C either in terms of increasing or decreasing C values, and in a further aspect can go to 710 and, within each group (if any) of data channels having the same exponent E value and coefficient C value, sort data channels in terms of segment length, either in increasing or decreasing order.

In another aspect, a prioritization mechanism can be according to segment length. In one alternative according to this aspect, data channels having the shortest segment length can be scheduled first. In another alternative, data channels having the longest segment length can be scheduled first.

Continuing to refer to FIG. 7, after the data channel ordering operation 704, data channels can be scheduled or assigned slots in the data channel assign operation 706. In one aspect, the data channel scheduling operation 706 can use the priority determined in the ordering operation 704. As described in greater detail below, in an aspect, the data channel assign operation is iterative, where each iteration attempts to schedule data channels having identical segment intervals, i.e., the same periodicity. In a further aspect, also described in greater detail at later sections, when two or more such identical segment interval data channels occur they can be scheduled together with an interval between them that is determined by their quantity. For example, and as will be shown by illustrative operations described in greater detail at later sections, if two data channels having the same segment interval occur, they can be scheduled one half of a segment interval apart. If three data channels having the same segment interval, they can be scheduled one third of a segment interval apart.

In an aspect of one or more exemplary embodiments, and shown by illustrative operations described at later sections, after two or more data channels of the same segment interval are scheduled, the two or more data channels can be treated as a single "virtual" data channel. The component data channels of the "virtual" data channel are spaced by segment intervals and, as will be understood, the larger the number of equal segment interval data channels are combined into the "virtual" data channel, the shorter the segment interval between each of the component data channels, and therefore the shorter the periodicity. For example, three data channels having the same segment interval, and scheduled one third of a segment interval apart from each other, can be treated as a single virtual data channel having a virtual segment interval one third as large as each data channel's segment interval by itself (which can also be thought of in terms of frequency or sample rate).

Referring back to FIG. 6, it will be understood that the assign data channel operation 706 may be based on remaining or unused slots, in addition to the periodicity or segment interval. For example, referring to data channel assignment state 602*a*, there are six buckets, all formed with a bucket length of eight slots, with Buckets I, III and V having a bucket offset of six, and therefore six unused slots, and Buckets II, IV and VI having a bucket offset of four, and therefore having four unused slots. For purposes of showing concepts by example, it will be assumed that the assign data channel operation 706 has two additional channels, labeled for this example as data channel "D" and data channel "E," each having a segment length of three slots. As a consideration in an assignment according to an aspect, the data channel assignments in Buckets I, III and V have a bucket offset of six meaning, in aspects configured to maintain contiguous unused slots, that Buckets I, III and V have six unused slots each. The data channel assignment in Buckets II, IV and VI, on the one hand has a bucket offset of three slots meaning, in aspects configured to maintain contiguous unused slots, that Buckets II, IV and VI each have only three unused slots. The assign data channel operation 706 can assign data channels "D" and "E" to any of Buckets I, II, III, IV, V and VI. However, assigning either of data channels "D" or "E" to one of Buckets II, IV or VI would leave only one unused slot in whichever of the buckets in which the assignment is made. On the other hand, assigning either of data channels "D" or "E" to one of Buckets I, III or V would leave only three unused slots in whichever of these buckets in which the assignment was made. As appreciated by persons of ordinary skill in the art, a span of three slots has a higher probability of being usable, i.e., of being filled, than a span of only one slot. In an aspect, the assign data channel operation 706 provides for assigning the data channels accordingly by assigning the data channel to the bucket having the largest quantity of unused slots, in other words the bucket in which the current data channel assignment position has the largest bucket offset.

Referring still to FIGS. 6 and 7, the data channel assignment state 602*b* reflects the assignment of the example data channel "D" in accordance with this aspect. Data channel assignment state 602*c* also reflects the assignment of the example data channel "E" in accordance with this aspect. Stated differently, in an aspect, every iteration of the data channel assignment operation 706 attempts to assign data channels to slots having the largest bucket offset. Referring again to the data channel assignment states 602*b* and 602*c*, in one aspect, the data channel assignment operation 706 can assign data channels to cause them to be flush against other data channels. The data channel assignment states 602*b* and 602*c* reflect an assignment according to this aspect. In one alternative aspect, the data channel assignment operation 706 can assign data channels to a position in the bucket that leaves a gap between that data channel and the other, previously assigned data channel.

Referring to FIG. 7, it may occur during an iteration of the data channel assignment operation that there are not enough remaining unused slots for a data channel to be assigned. Optionally, when this happens, the process 700 can return to the select clock speed operation 702, where the clock speed is increased thus allowing all data channels to be scheduled.

At the iteration of the data channel assign operation 706 that achieves assignment of all data channels that have been scheduled, either because the initial clock speed selected at 702 was sufficient or because previous iterations have obtained such a clock speed, or another termination condition is met, the process 700 can go to a control channel scheduling operation 708. The control channel scheduling operation 708 can also be referred to as "subframe mode determination."

In an aspect, the control channel scheduling operation 708 is iterative, where the goal of the iteration is maximizing the number of slots that the control channel is able to use, thus maximizing the information size of the control channel. In an aspect, the control channel scheduling operation 708, like the iterative aspect of the data channel assign operation 706, can attempt to schedule the control channel until the control channel does not overlap with any data channels. In one aspect the control channel scheduling operation 708 can perform this by trying different slot assignments. In another aspect, as shown at FIG. 7, the process 700 can return to the select clock speed operation 702 and change the clock frequency.

Referring still to FIG. 7, the process 700 can end, for example, until another data channel requires scheduling, when the control channel scheduling operation 708 has scheduled all control channels. As will be appreciated by persons of ordinary skill in the art from this disclosure, at the end 710 of the process 700 all data and control channels will have been assigned in a manner that, as provided by the embodiments, optimizes the clock speed for minimum power consumption. More particularly, in accordance with one or more exemplary embodiments, the process 700 tries to first schedule data channels, at the data channel assign operation 706, and then schedule control channels at the control channel scheduling operation 708 such that a low number of slots goes unused and thus a low clock speed can be utilized. In an aspect the process 700 is automated, which provides new scheduling for new data and control signals and, based on the operations described above, continuously attempts to optimize or improve the efficient use of the data channel.

Referring again to FIG. 6, it will be understood by persons of ordinary skill in the art having view of this disclosure that a bucket, e.g., each of Buckets I-VI, is a construct that refers to a contiguous section of the data line or to a group of contiguous slots. It will also be understood by such persons that various ones of the exemplary embodiments employ the bucket to keep track of unused or unassigned slots.

Further aspects showing examples of forming buckets will now be described in greater detail. First, with respect to terminology, it will be understood that "bucket interval" can be defined as the data channel's base segment interval divided by $2^e$, where e is either a positive integer or zero, such that the data channel's base segment interval is evenly divided by the power of 2. This can be expressed as: bucket interval=base segment interval/$(2^e)$. The bucket interval can preferably, in one aspect, be chosen to be less than the segment interval of the data channel. Then, for each data channel, a bucket quantity, arbitrarily labeled "B," can be defined as the data channel's segment interval divided by the bucket interval.

Figure 12A:
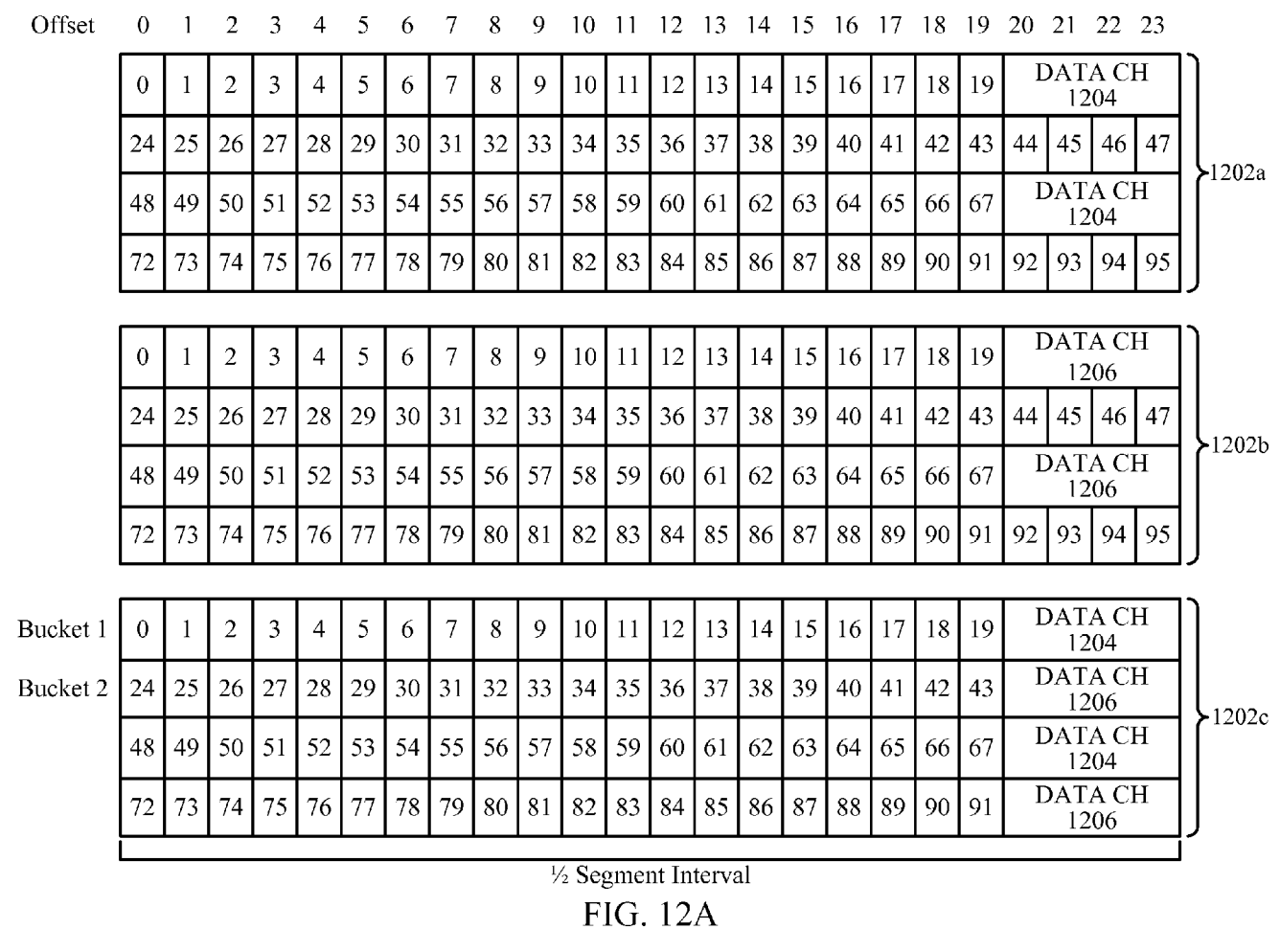

In an aspect, in forming buckets in processes according to an embodiment, a target quantity can be generated, where "target quantity" is a desired number of buckets that a current data channel segment interval is to be split into, and in a further aspect, bucket quantity can be set equal to the target quantity. It will be understood that the bucket quantity is the number of buckets that a segment interval is broken into. For example, in FIG. 3 the bucket quantity is two and FIG. 12*b*, described in greater detail at later sections, shows the bucket length is reduced to 12 slots as compared to the 24-slot-long buckets in FIG. 12*a*. In other words, the buckets of FIG. 12*a* are halved to reach the buckets of FIG. 12*b*. In an aspect the bucket length, meaning the number of slots in the bucket, can be set equal to the target length.

Figure 8:
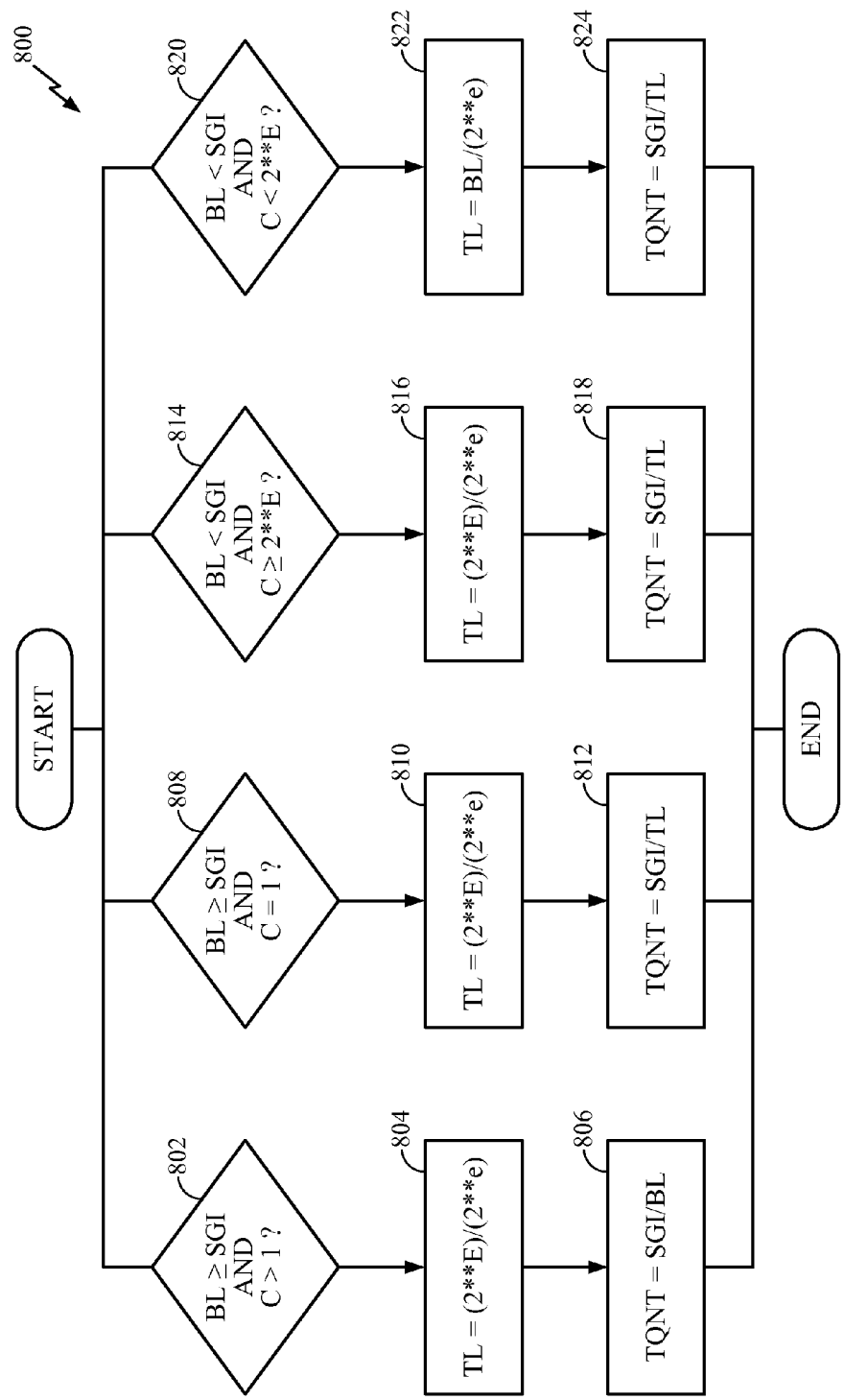
FIG. 8 shows a logic flow schematic of one example determining target length and target quantity process in accordance with an embodiment.

FIG. 8 shows a logic flow schematic 800 for one process of determining target length and target quantity in a method and system according to an embodiment for scheduling data and a control channel on a generic data line.

Referring to FIG. 8, if test 802 determines the bucket length (also referenced as "BL") is greater than or equal to segment interval (also referenced as "SGI"), and coefficient C is greater than 1, the target length (also referenced as "TL") can at 804 be set to $(2^E)/(2^e)$ where e is any positive integer or zero, and the target quantity (also referenced as "TQNT") can be set at 806 to the SGI divided by the current BL. If test 808 determines BL is greater than or equal to SGI and coefficient C is equal to 1, TL can at 810 be set equal to $(2^E)/(2^e)$ where e is any positive integer, and TQNT can at 812 be to SGI divided by TL. If test 814 determines BL to be less than SGI but greater than or equal to $(2^E)$, TL can at 816 be set equal to $(2^E)/(2^e)$ where e is any positive integer or zero, and TQNT can at 818 be set equal to SGI divided by TL. If test 820 determines BL is less than SGI and less than $(2^E)$, TL can at 822 be set to BL divided by $(2^e)$ where e is any positive integer or zero, and at 824 TQNT can be set equal to SGI divided by TL.

Figure 9:
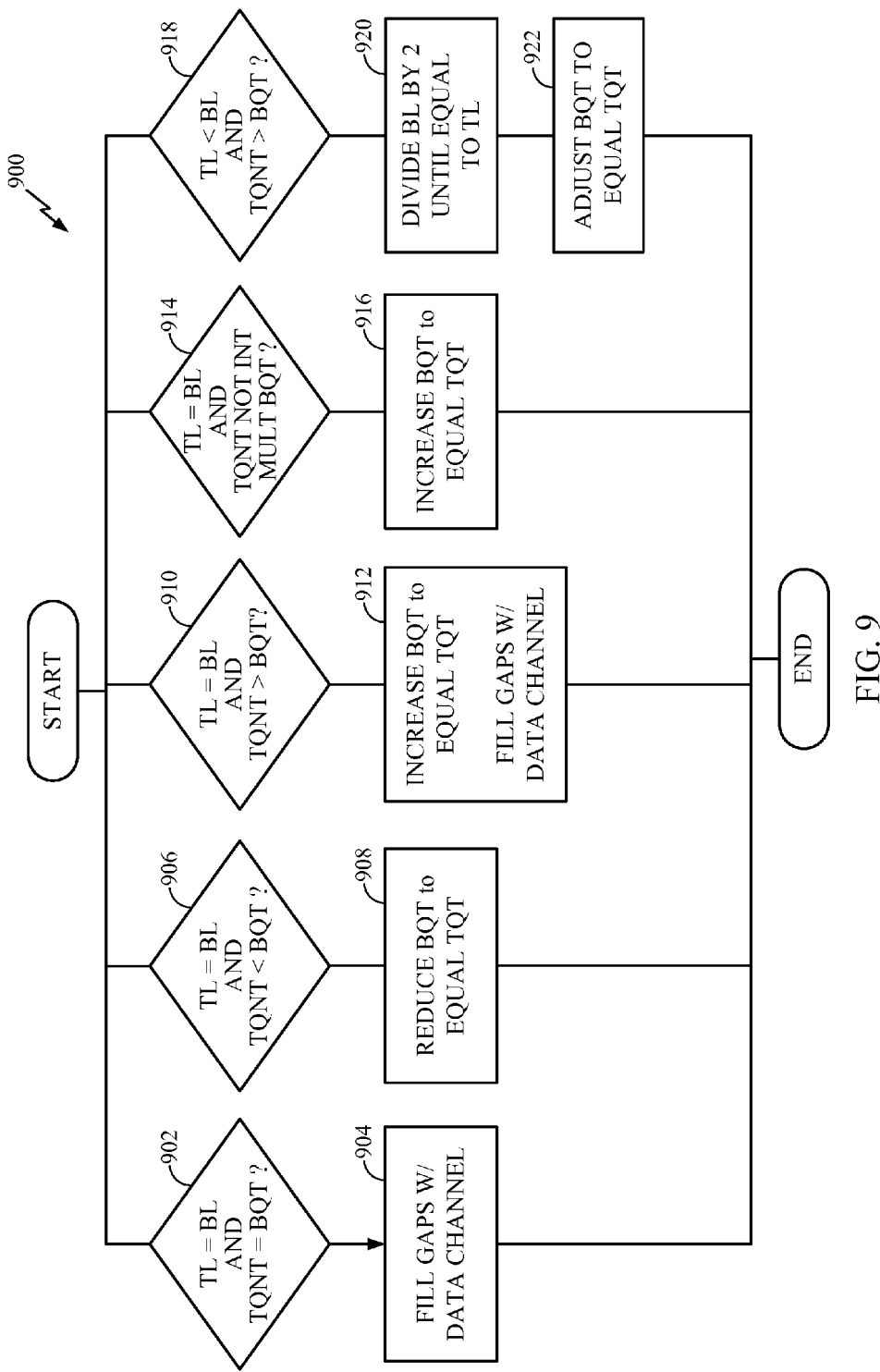
FIG. 9 shows a logic flow schematic for one process of determining offset in a scheduling data channels and a control channel according to an embodiment.

FIG. 9 shows a logic flow schematic 900 for one process of determining segment offset in a scheduling data and a control channel on a data line according to one or more exemplary embodiments. Referring back to FIGS. 4, 5 and 6, as previously described "segment offset" means the spacing of a data channel from a segment interval start. For example, the FIG. 6 data channel assignment state 602*b* shows data channel "D" having a segment offset of 35, which is in Bucket V at a bucket offset of three, consisting of slots 35, 36 and 37. As will be understood, the determination of segment offset in methods and systems according to one or more exemplary embodiments can be a based on, or can be a function of one or more of the current state segment interval, gaps, bucket state, bucket length, and target length. In an aspect, the function applied can be selected from a plurality of different functions, in accordance which scenario is presented, where "scenario" in this context can mean a relative state of the target length (TL), bucket length (BL), and bucket quantity or (BQT). The FIG. 9 logic flow schematic 900 shows five example scenarios, and the segment offset function selected and applied for each.

Referring to FIG. 9, if test 902 determines the target length is equal to the bucket length and the target quantity is equal to the bucket quantity, the bucket length can remain unchanged, the bucket quantity can remain unchanged, and at 904 gaps can be filled with data channels. If test 906 determines the target length is equal to bucket length and the target quantity is less than bucket quantity, the bucket length can remain unchanged, and at 908 the bucket quantity can be reduced to equal the target quantity, and gaps can be ignored (not filled with data channels). If test 910 determines the target length equals bucket length and the target quantity is greater than bucket quantity, and the target quantity is an integer multiple of bucket quantity, then at 912 the bucket length can remain unchanged, the bucket quantity can be increased to equal the target quantity, and gaps can be filled with data channels. If test 914 determines the target length equals the bucket length, and the target quantity is not an integer multiple of bucket quantity, then at 916 the bucket length can remain unchanged, the bucket quantity can be increased to equal the target quantity, and gaps can be ignored. If test 918 determines the target length is less than the bucket length, then at 920 the bucket length can be halved repeatedly until the bucket length is equal to the target length, and at 922 the bucket quantity can be increased or decreased as necessary to equal the target quantity, and gaps can be ignored.

Whichever of the scenarios detected by tests 902, 906, 910, 914 or 918 occurs, the current data channel being processed or scheduled is placed at the end of the bucket with the greatest number of unused or unassigned slots—in other words the largest segment offset that falls within a bucket having a current channel assignment with the largest bucket offset, i.e., the bucket with the greatest number of unused or unassigned slots.

In another process according to an embodiment, open slots can be defined as an array of integers, where the length of the current open slots array is equal to the current bucket quantity, a bucket interval reduction can be defined as the process of reducing the bucket interval size by half. In this bucket interval adjustment, the bucket quantity, B, unless the previous value of B was not evenly divisible by 2, in which case bucket quantity adjustment can be performed prior to bucket interval reduction to change the bucket quantity to be 2.

Figure 10:
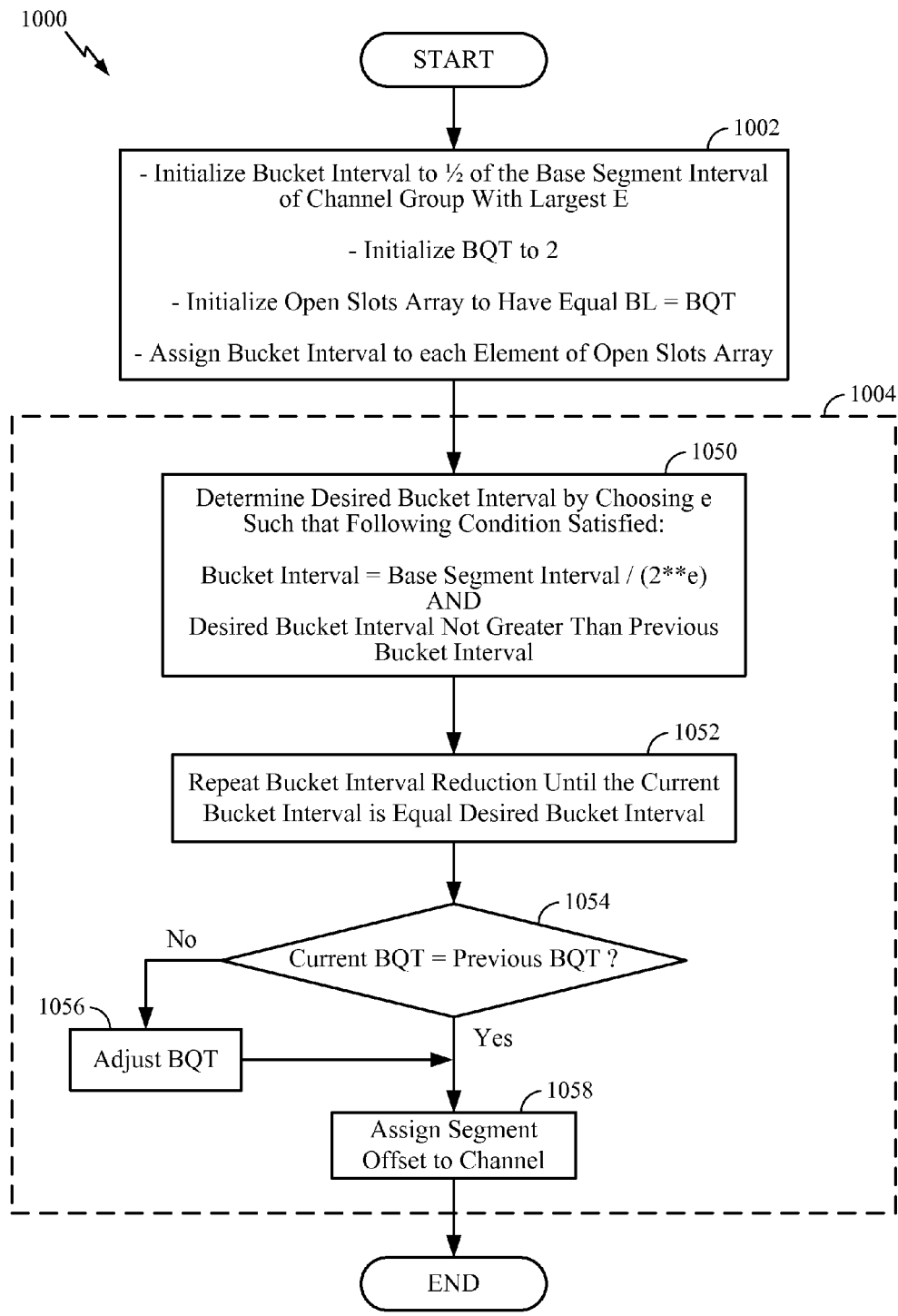
FIG. 10 shows a logic flow schematic of one process for data channel scheduling according to an embodiment.

FIG. 10 shows a logic flow schematic of one process 1000 for data channel scheduling according to an embodiment. A process such as 1000 can implement a data channel assign operation such as the FIG. 7 data channel assign operation 706, and can be implemented by the following steps: initializing, at 1002, the bucket interval to be half of the base segment interval of the channel group with largest exponent E, together with initializing the bucket quantity to be 2, initializing the open slots array to have length equal to the bucket quantity and assigning the value of the bucket interval to each element of the open slots array; and at 1004 processing channels sequentially, starting with channels from the group with the largest exponent E value and proceeding to channels from groups with successively smaller exponent E values. In an aspect the processing of channels at 1004 can include determining at 1050 the desired bucket interval for the channel by choosing a value for e such that bucket interval=base segment interval/$(2^e)$, such that the bucket interval is less than the segment interval and such that the desired bucket interval is not greater than the previous bucket interval. Upon the desired bucket interval being less than the previous bucket interval, the process can go to 1052 and perform bucket interval reduction repeatedly until the current bucket interval is equal to the desired bucket interval. In an aspect, the process can then go to 1054 to determine whether the current bucket quantity or BQT is equal to the previous BQT then, if it is the, at 1058, can perform segment offset assignment for the channel. If the determination at 1054 is that the current BQT is not equal to the previous BQT then, at 1056, the process can perform bucket quantity adjustment and then to 1058 to perform segment offset assignment for the channel.

Figure 11:
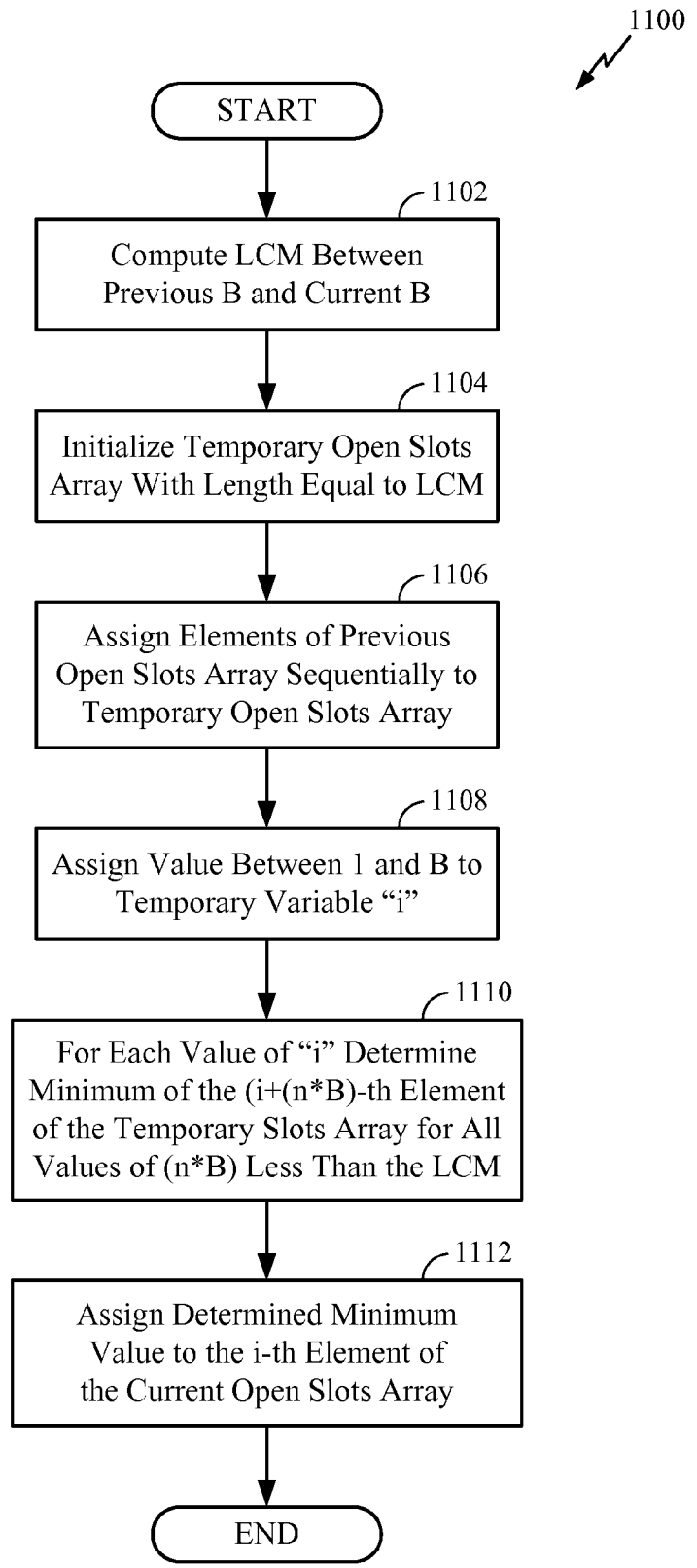
FIG. 11 shows a logic flow schematic of one bucket quantity adjustment process according to an embodiment.

FIG. 11 shows a logic flow schematic of one process 1100 in a bucket quantity adjustment in accordance with to an embodiment. Referring to FIG. 11, one example bucket quantity adjustment process 1100 can include computing, at 1102 a least common multiple (LCM) between the previous value of B and the current value of B. In an aspect, one process 1100 can, after the computing at 1102, go to 1104 and initialize a temporary open slots array to have length equal to the LCM, and then to 1106 to assign the elements of the previous open slots array sequentially to the temporary open slots array. In one aspect, an assignment at 1106 can assign the first element of the previous open slots array to the first element of the temporary open slots array, the second element d to the second element, and so forth in a similar progression. In another aspect, an assignment at 1106 can detect if the temporary open slots array has greater length than the previous open slots array and, after reaching the last element of the previous open slots array, restart at the first element of the previous open slots array.

With continuing reference to FIG. 11, after the assignment at 1106 the process 1100 can go to 1108 and assign a value between 1 and B to a temporary variable, which will be arbitrarily labeled as "i." As previously recited in this disclosure, the variable "B" is the current bucket quantity. Then, after the assignment of a value to "i" at 1108, the process 1100 can go to 1110 where, for each value of i, it can determine minimum elements of each of a plurality of temporary open slots arrays. In an aspect, 1110 can include determining the minimum of the i-th element of the temporary open slots array, the (i+B)-th element of the temporary open slots array, the (i+(2*B))-th element of the temporary open slots array, and so forth in the same progression, for all multiples of B less than the LCM—in other words the minimum of the (i+ (n*B))-th element for all values of n, starting at 0, for which (n*B) is less than LCM. After determining the minimum values at 1110, one example process 1100 can go to 1112 and assign the determined minimum value to the i-th element of the current open slots array, whereupon the process can end.

A bucket interval reduction in an embodiment will now be described. In an aspect the previous bucket quantity B should be evenly divisible by 2. If it is not divisible by 2 then, according to this aspect, current bucket quantity can be set to 2. In an aspect of a bucket interval reduction, there can be an initializing of the current open slots array (not explicitly shown) to have the same length as the previous open slots array and that sets all the elements of the current open slots array to a value of 0. In an aspect, the current bucket interval can be set at one-half of the previous bucket interval, and the temporary variable i can take on the values of 1 through B/2 sequentially. In an embodiment, for each value of i: (a) the minimum is taken of the i-th element of the previous open slots array and the (i+(B/2))-th element of the previous open slots array and that minimum value is then assigned to the (i*2)-th element of the current open slots array. In an aspect, the current bucket interval value is subtracted from the (i*2)-th element of the current open slots array, and the current bucket interval value is assigned to the ((i*2)−1)-th element of the current open slots array. In an aspect, if the (i*2)-th element of the current open slots array is negative, the (i*2)-th element of the current open slots array can be added to ((i*2)−1)-th element of the current open slots array, and then the (i*2)-th element of the current open slots array can be set to 0.

In an embodiment, segment offset assignment can comprise the following steps: (1) determine the element of the current open slots array that has the largest value, assign to the temporary variable i the array index corresponding the largest value (i=1 can be the first array index); (2) subtract from the i-th element of the current open slots array the channel's segment length; (3) if the i-th element of the current open slots array is negative, and if i is equal to 1 or if the (i−1)-th element of the current open slots array is less than the bucket interval, then fail the algorithm; (4) if the i-th element of the current open slots array is negative, add the value of the i-th element of the current open slots array to the (i−1)-th element of the open slots array, and then set the i-th element of the open slots array to zero; (5) if i is greater than one and if the (i−1)-th element of the open slots array is negative, then fail the algorithm; and (6) assign to the current channel a segment offset value equal to (i−1) multiplied by the bucket interval, plus the value of the i-th element of the current open slots array.

It should be noted that gaps can be filled when performing bucket interval reduction, and when performing bucket quantity adjustment if the current bucket quantity is not an even multiple of the previous bucket quantity.

FIG. 12a illustrates one aspect in a process for assigning data channel slots in accordance with an embodiment, in reference to 96 slots of a superframe illustrated in four separate rows for convenience. It will be understood that the $25^{th}$ slot, the first slot of the second row, actually comes immediately following the $24^{th}$ slot, the last slot of the first row. The segment interval for both the first data channel 1204 and the second data channel 1206 is 48 slots. A half interval is therefore 24 slots. As can be seen, the largest slot values in the first half of each segment interval are the $20^{th}$ through $23^{rd}$ slots (assuming slot assignments where the first slot is the $0^{th}$ slot).

With continuing reference to FIG. 12a, channel assignment states 1202a and 1202b show first and second data channels 1204, 1206 as they would appear without any other data channels. As previously described, the first and second data channels 1204, 1206 have the same segment interval, 48 slots. The first data channel 1204 has a segment length of four and a segment interval of 48, thus two periods or instances of first data channel 1202 fit within the 96 illustrated slots. As can be seen in the channel assignment state 1202a, if the entire superframe had 96 slots, then the first data channel 1204 would only repeat twice in the entire superframe. A similar description applies to the second data channel 1206 illustrated in the channel assignment state 1202b. As seen, both the first and second data channels 1204, 1206 have an equivalent segment interval of 48. Referring to the channel assignment state 1202c, in a data channel assignment in accordance with an embodiment, the first and second data channels 1204 and 1206 can be assigned to slots that are one half segment interval apart. As can be seen in the channel assignment state 1202c the first and second data channels 1204, 1206 can be treated as one "virtual channel" having a segment interval of 24, or half the segment interval (or twice the frequency or half the period) of the first and second data channels 1202, 1204 on their own.

Referring to FIG. 12b, in an aspect, a data channel having half the segment interval of two data channels that have already been scheduled can be further scheduled with two data channels. In the depicted example, two of the buckets at channel assignment state 1210a are labeled Bucket 1', and two are labeled Bucket 2'. Also in channel assignment state 1210a, a first data channel 1212 can be assigned at one of the Buckets 1' and a second data channel 1214 can be assigned at the other of the Buckets 1'. In channel assignment state 1210c, a third data channel 1216 can be assigned to both Buckets 1'. Referring to the channel assignment state 1210a, it can be seen that each row represents a quarter of the segment interval of either of the first or second data channels 1212, 1214. Referring now to channel assignment state 1210b, it can be seen that the third data channel 1216 has a segment interval equal to a half of the segment interval of both the first and second data channels 1212, 1214. If no data channels have a segment interval greater than 24, then a virtual channel having a segment interval of 24 can be considered when trying to find another data channel to assign with the first and second data channels 1212 and 1214, also having a segment interval of 24. As shown by the third data channel 1216 and the channel assignment state 1210c, if another data channel has a segment interval of 24, then that data channel can be assigned slots that are one half segment interval apart from the virtual channel.

FIG. 12c illustrates 96 slots of a superframe, in four separate rows, as described in reference to FIG. 12a, with a portion of the slots assigned to the first, second, and third data channels 1212, 1214, and 1216 in accordance with the FIG. 12b channel assignment state 1210c. Referring to FIG. 12c, as can be seen, each data channel 1212, 1214, and 1216 has been assigned slots at the largest bucket offset within each channel's respective bucket.

If the illustration in reference to FIGS. 12a-12c were of a SLIMBUS data line, then the subframe width could be 6 or 24 since all other subframe widths would lead to overlap between data channels and control channels. The subframe width 24 works in concert with a data channel segment interval of 48 since they are multiples of $2^E$ of each other.

Figure 13:
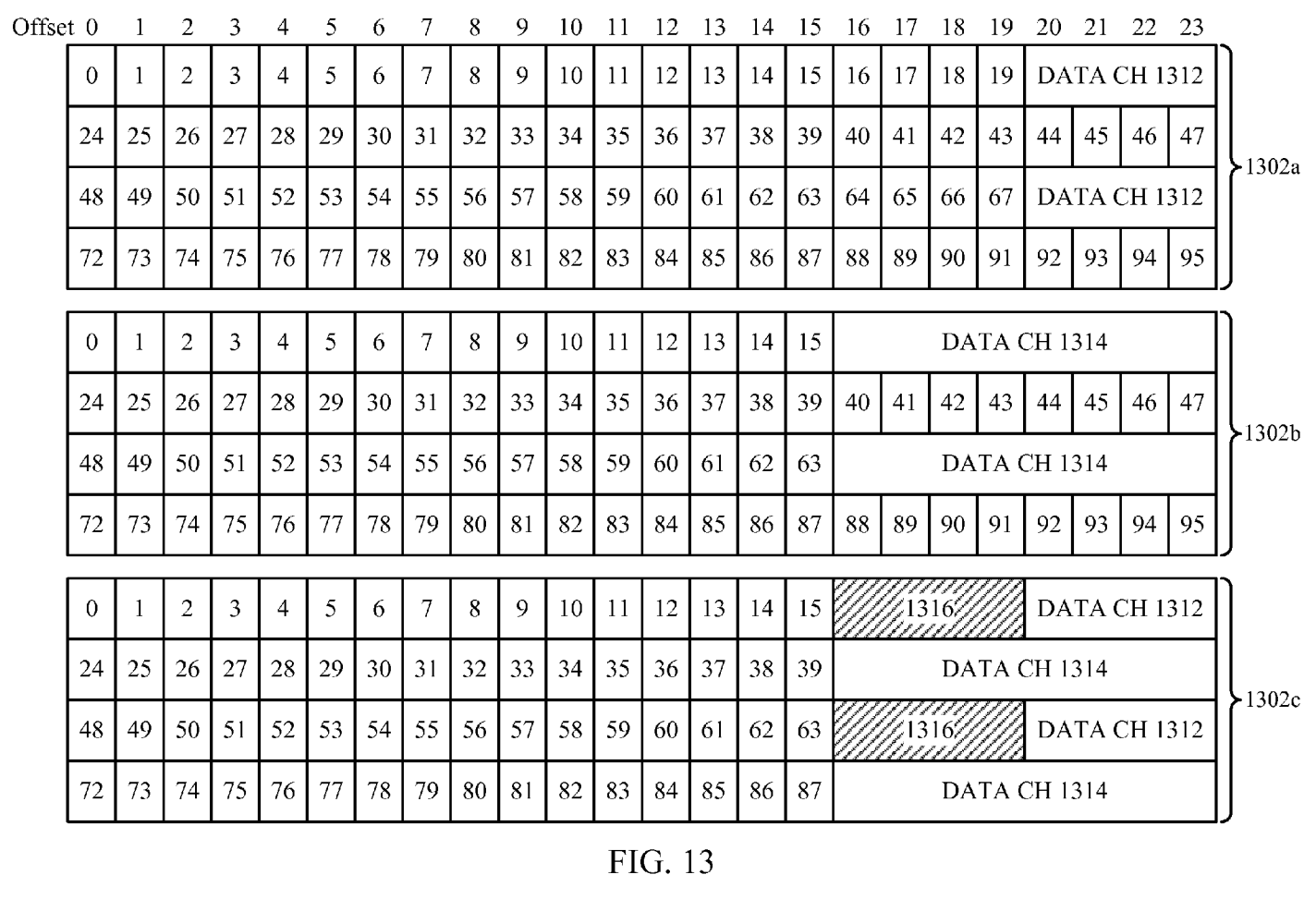

FIG. 13 illustrates gaps that can form when two data channels having equivalent segment intervals are assigned slots one half segment interval apart, but the two data channels do not have the same segment length (number of slots in the data channel). Referring first to the FIG. 13 channel assignment state 1302a, this is identical to the FIG. 12a channel assignment state 1202a, with the FIG. 13 first data channel 1312 assigned to respective buckets (shown but not separately numbered) with a segment interval of 48 slots, at a bucket offset of 20 slots, as is shown by the FIG. 12a channel assignment state 1202a for its first data channel 1204. The FIG. 13 channel assignment state 1302b, is similar, with another second data channel 1314 assigned to respective buckets (shown but not separately numbered), also at a segment interval of 48 slots but, because of having a segment length of eight slots, as opposed to the first data channel 1312 segment length of four slots, having a bucket offset of 16 slots instead of 20 slots.

Referring still to FIG. 13, as shown by channel assignment state 1302c, the virtual channel (shown but not separately labeled) formed by a scheduling in accordance with an exemplary embodiment of the first data channel 1312 and the second data channel 1314 can leave gaps 1316. Such gaps 1316 can, in one aspect, be dealt with in two manners: the gaps 1316 can either be ignored or they can be filled with other data channels or a portion of one or more other data channels.

Figure 14:
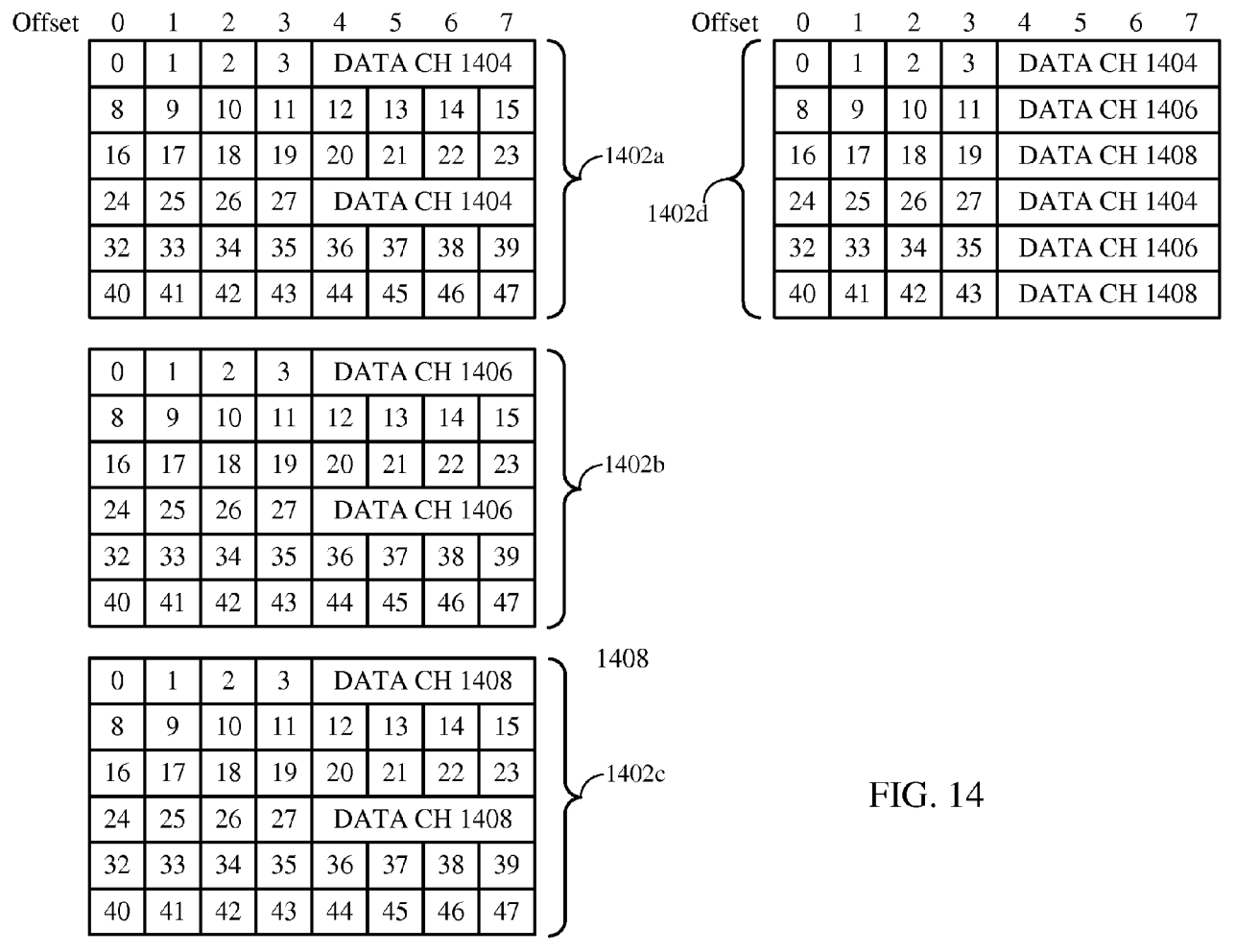

FIG. 14 shows a combining 1400 into a single virtual data channel multiple data channels all having the same segment interval, in accordance with an embodiment. The combining 1400 is substantially similar to the FIG. 12b assignment of data channels 1212, 1214 and 1216 into a single virtual channel, shown by channel assignment state 1210c, but with 48 slots of a superframe (not explicitly shown in FIG. 14) arranged as six rows (shown but not separately numbered), or buckets, having a bucket length of eight slots. Referring to FIG. 14, channel assignment states 1402a, 1402b and 1402c represent an assignment of a first data channel 1404, a second data channel 1406 and third data channel 1408, respectively, assuming each was the only data channel. Channel assignment state 1402d shows all of the first data channel 1404, second data channel 1406 and third data channel 1408 assigned as one virtual channel, filling the last four slots of each of the six rows, which is a bucket offset of four.

Figure 15:
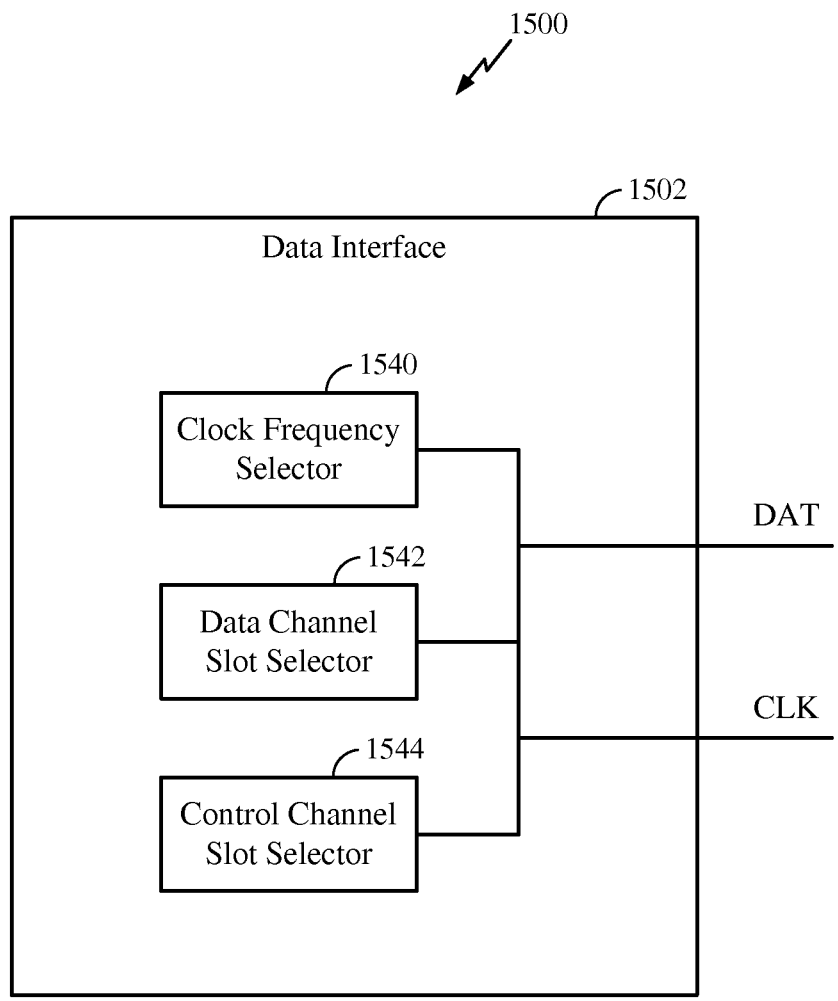
FIG. 15 is a logical schematic of a data interface.

FIG. 15 illustrates an embodiment of a data interface 1502 having a clock frequency selector 1540, a data channel slot selector 1542, and a control channel slot selector 1544. The data interface 1502 is configured to send and receive data on a data line, where a clock line is used to synchronize data on the data line.

The clock frequency selector 1540 is not always implemented, but when it is, it is configured to select a clock frequency. The data interface 1502 has a reference frequency or root frequency (e.g., 24.576 MHz for certain audio applications). This reference frequency can be decreased in order to conserve power, which is done via halving the reference or root frequency via clock gears. In an embodiment, there are 10 clock gears between and including the integers 1 to 10. In clock gear 10, the data interface 1502 uses the reference or root frequency (e.g., 24.576 MHz), and in clock gear 9, the data interface 1502 uses half the reference or root frequency (e.g., 12.288 MHz). In other words, the clock frequency selector 1540 passes a clock signal related to the reference or root frequency as $1/(2^{10-E})$ where E is a range of integers between and including 1 to 10.

The data channel slot selector 1542 is configured to assign or schedule slots to the data channels. This process selects one or more consecutive slots for each data channel so that no data channels overlap and the number of unused slots is reduced (or minimized in an embodiment). If a set of slot assignments in which no data channels overlap cannot be found at a given clock frequency, then the clock gear can be increased (doubling the clock frequency) and the data channel slot selector 1542 can again attempt to assign or schedule slots to the data channels. Thus, the process of assigning or selecting data channels can be iteratively tied to the selection of a clock gear or clock frequency.

The control channel slot selector 1544 is configured to assign or schedule slots to the control channel after the data channel slots have been assigned. If the control channel cannot be assigned, because there are insufficient remaining unused or unassigned slots (e.g., the control channel and at least one data channel overlap), then the manager device 1622 of the FIG. 16 SLIMBUS component 1602 may use the data channel slot selector 1542 to find a different set of data channel slot assignments. Alternatively, the clock frequency selector 1540 may alter the clock frequency and then the data channel slot selector 1542 may iteratively assign or schedule slots to the data channel.

Figure 16:
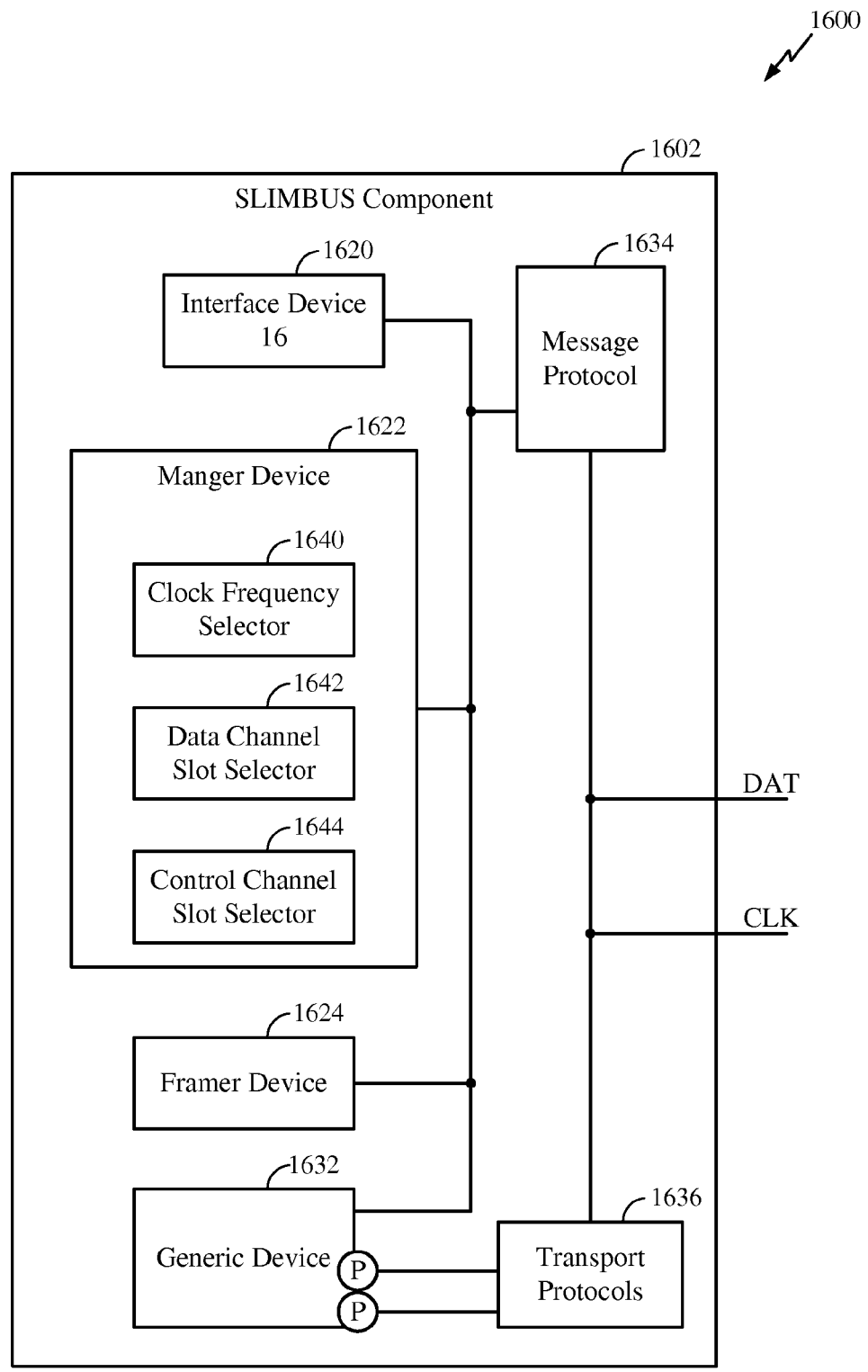
FIG. 16 is a logical schematic of a SLIMBUS component in accordance with an embodiment.

FIG. 16 illustrates an embodiment providing a SLIMBUS component 1602 having a clock frequency selector 1640, data channel slot selector 1642, and control channel slot selector 1644.

As shown the SLIMBUS component 1602 includes two lines—a data line and a clock line. The SLIMBUS component 1602 in this implementation also includes a manager device 1622. There is also an interface device 1620 and a framer device 1624. In certain embodiments, the SLIMBUS component 1602 does not include the manager device 1622 (or it is disabled) when another SLIMBUS component includes a manager device 1622.

The SLIMBUS component 1602 may also include a plurality of devices other than the interface device 1620, manager device 1622, or framer device 1624. These other devices are called generic devices 1632. In the illustrated embodiment, there is a single generic device 1632, but a plurality of generic devices 1632 is also possible.

The manager device, as illustrated, includes a clock frequency selector 1640, a data channel slot selector 1642, and a control channel slot selector 1644.

In an aspect the clock frequency selector 1640 can be omitted, for example by receiving a clock from external the SLIMBUS component 1602. In an aspect having the clock frequency selector 1640, it is configured to select a clock frequency, for example as described for the clock select operation 702 in FIG. 7. The SLIMBUS component 1602 can have a reference frequency or root frequency, for instance 24.576 MHz for certain audio applications. This frequency can be decreased in order to conserve power, which is done via halving the reference or root frequency via clock gears. There are 10 clock gears between and including the integers 1 to 10. In clock gear 10, the SLIMBUS component 1602 uses the reference or root frequency (e.g., 24.576 MHz), and in clock gear 9, the SLIMBUS component 1602 uses half the reference or root frequency (e.g., 12.2178 MHz). In other words, the clock frequency selector 1640 passes a clock signal related to the reference or root frequency as $1/(2^{10-E})$ where E is a range of integers between and including 1 to 10.

The data channel slot selector 1642 is configured to assign or schedule slots to the data channels. This process selects, for example in accordance with an embodiment described in reference to FIGS. 7 to 14, one or more consecutive slots for each data channel until a set of slot assignments is determined in which no data channels overlap and the number of unused slots is reduced (or minimized in an embodiment). In an aspect, in accordance with an embodiment described in reference to the FIG. 7 data channel assign operation 706, if a set of slot assignments in which no data channels overlap cannot be found at a given clock frequency, then the clock gear can be increased (doubling the clock frequency) and the data channel slot selector 1642 can again attempt to assign or schedule slots to the data channels. Thus, the process is iterative.

The control channel slot selector 1644 is configured to assign or schedule slots to the control channel after the data channel slots have been assigned, for example in accordance with an embodiment described in reference to FIG. 7, channel scheduling operation 708. If the control channel cannot be assigned, because there are insufficient remaining unused slots (e.g., the control channel and at least one data channel will overlap), then the manager device 1622 may use the data channel slot selector 1642 to find a different set of data channel slot assignments. Alternatively, the clock frequency selector 1640 may alter the clock frequency and then the data channel slot selector 1642 may assign or schedule slots to the data channel. Thus, this process is iterative.

The SLIMBUS component 1602 can further include an interface device 1620, which can provide bus management services for the component in which it resides. For example, the interface device 1620 can monitor framer layer and message protocols implemented by the SLIMBUS component 1602 (framer layer is discussed below). In addition, the interface device 1620 reports information about the status of the SLIMBUS component 1602 and the various devices 1620, 1622, 1624 and 1632.

The SLIMBUS component 1602 can further include an optional framer device 1624. Logic in the framer device 1624 can generate a guide and framing channels, which can be used to synchronize devices on the SLIMBUS.

The SLIMBUS component 1602 can further comprise a framer layer (not illustrated). The SLIMBUS framer layer can interleave control and data channels into a single, serialized bit stream (i.e., time division multiplexing). The framer layer may also split the incoming bit stream into separate control and data streams (i.e., demultiplex).

The SLIMBUS component 1602 can further provide a physical layer (not illustrated). The physical layer can provide for the transmission and reception of the SLIMBUS bit stream between components. The two lines, clock and data, may be the only wires required to implement the bus. The clock line can distribute a high-quality, unidirectional clock signal to all components. The data line can be bidirectional, carrying all information sent or received on the bus. Information can be signaled using Non-Return-to-Zero Inverted, or NRZI encoding.

Referring still to FIG. 16, the SLIMBUS component 1602 may further comprise a generic device 1632 that can provide basic functionality for a peripheral and/or can provide one or more interfaces to external applications. Generic device 1632 can provide ports, which are the endpoints for data transfers. The generic device 1632 can support all transport protocols including isochronous and extended asynchronous transfers. The generic device 1632 can pass data to the data line via ports and transport protocols 1636. There can be one transport protocol 1636 for each port. A port is a logical end to a data channel. To setup a data channel between two endpoints, one port on each end of a connection can be dynamically and logically connected to the data channel. Although only a single generic device 1632 is illustrated, multiple generic devices 1632 are possible. The generic device 1632 can transfer messages via a message protocol 1634.

In an embodiment, the generic device 1632 includes one port (not illustrated), and in other embodiments the generic device 1632 includes two or more ports (as illustrated). In an embodiment, the generic device 1632 is coupled to the data line via a non-ported line and at least two ports.

The SLIMBUS component 1602 may further include a clock line, which is used to pass timing data used for configuration and synchronization.

Figure 17:
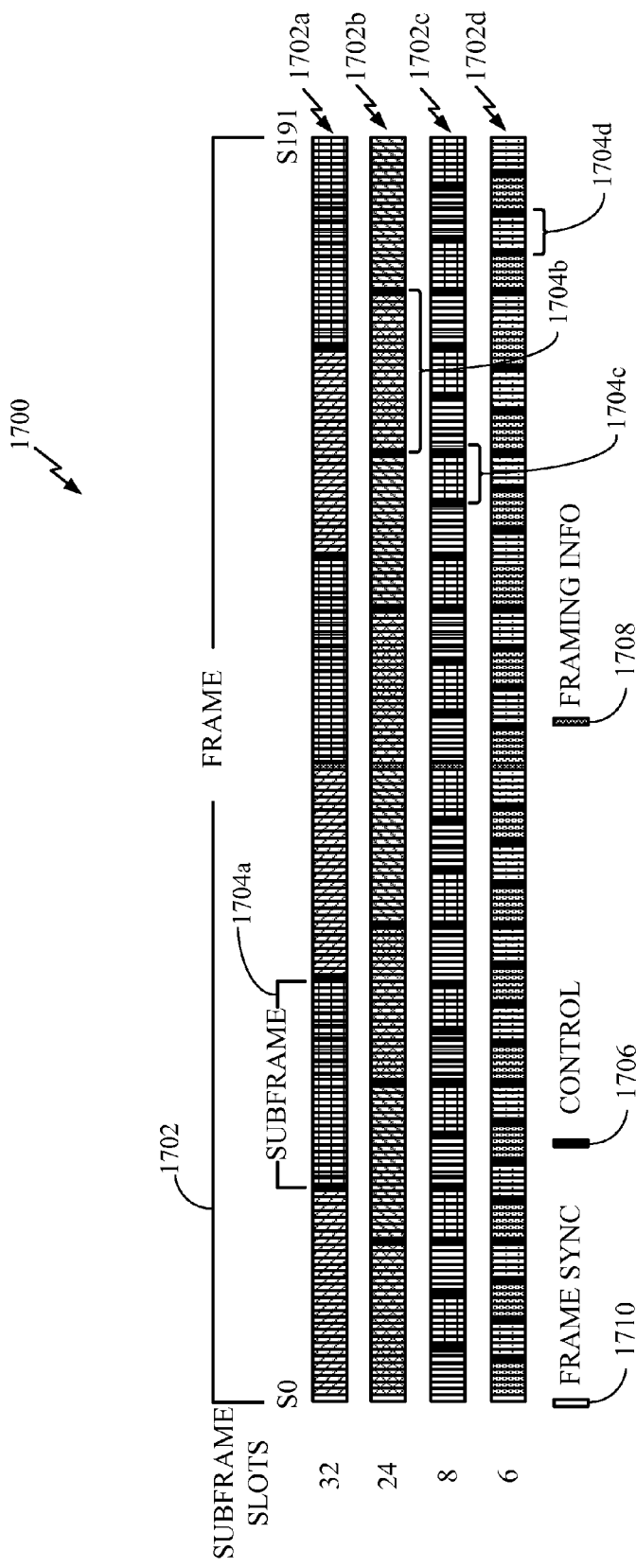
FIG. 17 illustrates organization structures for a SLIMBUS data line.

FIG. 17 illustrates organization structure 1700 with respect to a SLIMBUS data line (not explicitly shown), showing a sequence of four frames, labeled 1702a, 1702b, 1702c and 1702d (collectively "frames 1702" and generically referenced as "frame 1702"), each frame 1702 having 192 slots (shown but not separately numbered), which can be viewed as the smallest of the organizational structures indicated by FIG. 17. With respect to the 192 slots of each frame 1702, each slot can have four bits. In an aspect, eight of the frames 1702 can form a superframe (not entirely shown in FIG. 17), and therefore FIG. 17 can represent one-half of a superframe. Each frame 1702 can have a number subframes, examples of which are labeled 1704a, 1704b, 1704c and 1704d (collectively "subframes 1704" and generically referenced as "subframe 1704"). In an aspect, various subframes 1704 can have a respectively different sizes, i.e., a respectively different number of slots. The sizes of the sub-frames 1702 can be set by specification. For example, in accordance with the SLIMBUS specification, the FIG. 17 example subframes 1704a have 32 slots, while example subframes 1704b have 28 slots, example subframes 1704c have eight slots, and example subframes 1704c have six slots. In an aspect, each subframe 1704 is bordered by one or more slots carrying a control channel, e.g., the example control channel 1706, framing information, e.g., the example framing information 1708, or a frame sync, e.g., the example frame sync 1710. Each subframe 1702 can also contain slots having assigned data channels and unused slots. In accordance with various exemplary embodiments, the number of unused slots can be reduced or minimized to increase bandwidth. Subframes can have four different sizes or lengths—32 slots, 24 slots, 8 slots, or 6 slots.

Figure 18:
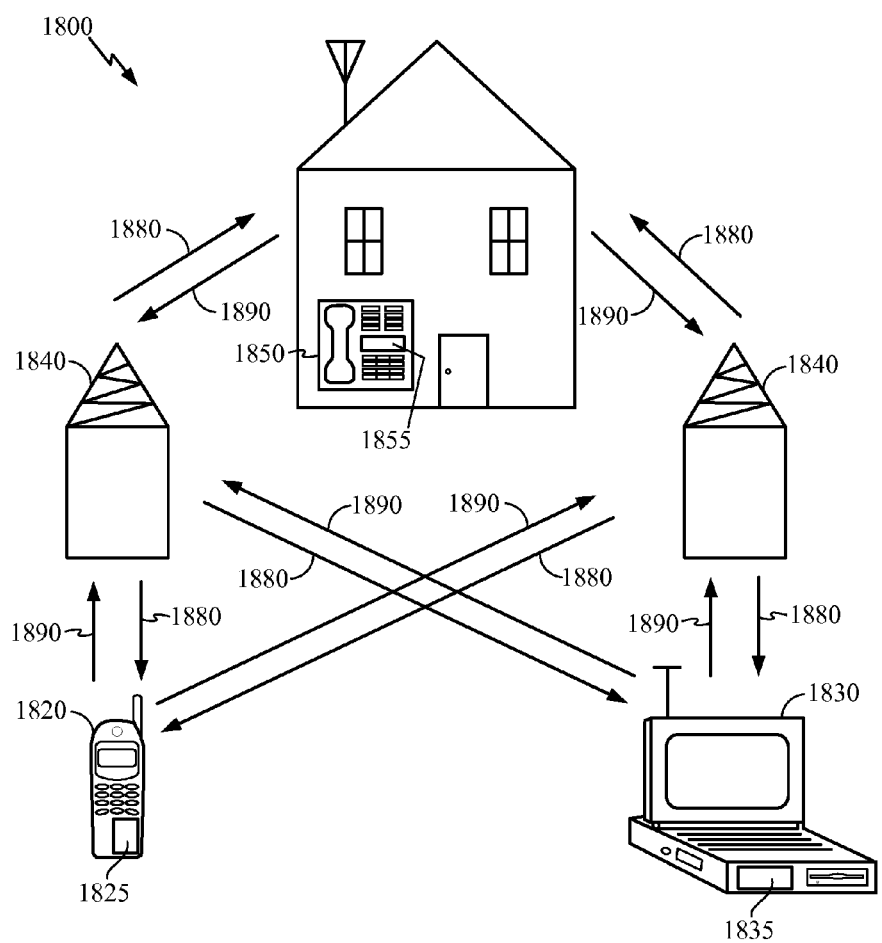
FIG. 18 is a logical block schematic of example personal computing devices according to an embodiment.

FIG. 18 illustrates an exemplary wireless communication system 1800 in which one or more embodiments of the disclosure may be advantageously employed. For purposes of illustration, FIG. 18 shows three remote units 1820, 1830, and 1850 and two base stations 1840. It will be recognized that conventional wireless communication systems may have many more remote units and base stations. The remote units 1820, 1830, and 1850 include semiconductor devices 1825, 1835 and 1855 (including on-chip voltage regulators, as disclosed herein), which are among embodiments of the disclosure as discussed further below. FIG. 18 shows forward link signals 1880 from the base stations 1840 and the remote units 1820, 1830, and 1850 and reverse link signals 1890 from the remote units 1820, 1830, and 1850 to the base stations 1840.

In FIG. 18, the remote unit 1820 is shown as a mobile telephone, the remote unit 1830 is shown as a portable computer, and the remote unit 1850 is shown as a fixed location remote unit in a wireless local loop system. For example, the remote unit may be one or more of a mobile phone, hand-held personal communication systems (PCS) unit, portable data units such as a personal data assistant, navigation devices (such as GPS enabled devices), set top box, music player, video player, entertainment unit, fixed location data unit such as a meter reading equipment, or any other device that stores or retrieves data or computer instructions, or any combination thereof. Although FIG. 18 illustrates remote units according to the teachings of the disclosure, the disclosure is not limited to these exemplary illustrated units. Embodiments of the disclosure may be suitably employed in any device which includes at least one semiconductor die having active integrated circuitry including memory and on-chip circuitry for test and characterization.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for implementation. Accordingly, the invention is not limited to illustrated examples and any means for performing the functionality described herein are included in embodiments of the invention.

The foregoing disclosed devices and functionalities may be designed and configured into computer files (e.g., RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. The chips are then employed in devices described above.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for scheduling data channels and a control channel on slots of a data line configured to propagate a plurality of the data channels and the control channel in slots, in a time-division multiplexing, with a segment interval between successive instances of the data channels, the method comprising:

sorting data channels into an order for scheduling in the slots on the data line, the sorting being configured to express the segment intervals as $C*(2^E)$, C being a constant not divisible by 2, and to sort the data channels according to an increasing order or a decreasing order of the in terms of an exponent E;

constructing a plurality of buckets, each of the buckets referring to a group of contiguous slots on the data line, each of the buckets having a bucket length and a bucket quantity, the bucket length being a number of contiguous slots in a bucket, and the bucket quantity being a number of buckets in the segment interval;

repeating iterations of selecting, as a selected data channel, a data channel having a largest E, from among plurality of the data channels not yet assigned slots and, for each selected data channel, determining which condition, among a set of conditions, is met by a combination of the bucket quantity, the bucket length, the segment interval of the selected data channel, and the coefficient C of the equation by which the segment interval of the selected data channel is expressed and, based on the condition that is determined, setting a target length and a target quantity, assigning the selected data channel to contiguous unassigned slots among the slots, with a conditional adjustment of the bucket length and of the bucket quantity; and assigning the control channel to slots on the data line that are contiguous and unassigned subsequent to assigning the data channels, wherein assigning the selected data channel to contiguous unassigned slots among the slots, with the conditional adjustment of the bucket length and of the bucket quantity, comprises determining which scenario is met by a relative state a relative state of the target length, the target quantity, the bucket length and the bucket quantity, among a given set of scenarios of said relative state, selecting, based on which scenario is determined as met, between changing and not changing the bucket length, and between changing and not changing the bucket quantity and, according to a result of the selecting, changing or not changing the bucket length and the bucket quantity, and placing the selected data channel at the end of the bucket with a greatest number of unassigned slots.

2. The method of claim 1, wherein determining which condition, among the set of conditions and, based on the condition that is determined, setting the target length and the target quantity, is further configured to (1) in response to the bucket length being greater than or equal to the segment interval concurrent with the coefficient C being greater than 1, setting the target length equal to $(2^E)/(2^e)$, e being any positive integer or zero, and tset the target quantity equal to the segment interval divided by the target length, (2) in response to the bucket length being greater than or equal to the segment interval concurrent with the coefficient C being equal to 1, setting the target length equal to $(2^E)/(2^e)$, e being any positive integer, and set the target quantity equal to the segment interval divided by the target length, (3) in response to the bucket length being less than the segment interval concurrent with being greater than or equal to $(2^E)$, setting the target length equal to $(2^E)/(2^e)$, e being any positive integer or zero, and set the target quantity equal to the segment interval divided by the target length, and (4) in response to the bucket length being less than the segment interval concurrent with being less than $(2^E)$, setting the target length equal to the bucket length divided by $(2^e)$, e being any positive integer or zero, and setting the target quantity equal to the segment interval divided by the target length.

3. The method of claim 2, wherein set of scenarios comprises a first scenario, a second scenario, a third scenario, a fourth scenario and a fifth scenario, the first scenario comprises the target length being equal to the bucket length concurrent with the target quantity being equal to the bucket quantity, the second scenario comprises the target length being equal to the bucket length and the target quantity being less than the bucket quantity, the third scenario comprises the target length being equal to the bucket length concurrent with the target quantity being greater than the bucket quantity further concurrent with the target quantity being an integer multiple of the current bucket quantity, the fourth scenario comprises the target length being equal to the bucket length, concurrent with the target quantity being not an integer multiple of the bucket quantity, and the fifth scenario comprises the target length being less than the bucket length, and wherein selecting, based on which scenario is determined as met, between changing and not changing the bucket length, and between changing and not changing the bucket quantity and, according to a result of the selecting, changing or not changing the bucket length and the bucket quantity, comprises:

in response to determining the first scenario, not changing the bucket length and not changing the bucket quantity, in response to determining the second scenario, reducing the bucket quantity to the target quantity, in response to determining the third scenario, increasing the bucket quantity to the target quantity, quantity in response to determining the fourth scenario, increasing the bucket quantity to the target, and in response to determining the fifth scenario, increasing or decreasing the bucket quantity as necessary to equal the target quantity, and repeatedly halving the bucket length until the bucket length is equal to the target length.

4. An apparatus comprising:

a data line having slots and a given number of the slots per unit time configured to propagate, in a time division multiplexed (TDM) manner:

a plurality of data channels, each of the data channels in one or more of the slots that are contiguous, each of the data channels having a segment interval between successive instances of the data channels; and a control channel in one or more contiguous slots among the slots of the slots that are contiguous;

a clock line;

a data channel slot selector configured to sort the data channels into an order, by expressing the segment intervals as $C*(2^E)$, C being a constant not divisible by 2, and sorting the data channels according to an increasing order or decreasing order of the exponent E;

construct a plurality of buckets, each of the buckets referring to a group of contiguous slots on the data line, each of the buckets having a bucket length and a bucket quantity, the bucket length being a number of contiguous slots in a bucket, and the bucket quantity being a number of buckets in the segment interval, repeat iterations of selecting a data channel having a largest E from among the plurality of data channels not yet assigned slots and, for each selected data channel, to determine which condition, among a set of conditions, is met by a combination of the bucket quantity, the bucket length, the segment interval of the selected data channel, and the coefficient C of the equation by which the segment interval of the selected data channel is expressed and, based on the condition that is determined, set a target length and a target quantity for a conditional adjustment of the bucket length and of the bucket quantity, assign the selected data channel to contiguous unassigned slots among the slots, with the conditional adjustment of the bucket length and of the bucket quantity and, in order to assign the selected data channel, is further configured to determine which scenario is met by a relative state a relative state of the target length, the target quantity, the bucket length and the bucket quantity, among a given set of scenarios of said relative state, select, based on which scenario is determined as met, between changing and not changing the bucket length, and between changing and not changing the bucket quantity and, according to a result of the selecting, to change or not change the bucket length and the bucket quantity, and to place the selected data channel at the end of the bucket with a greatest number of unassigned slots; and a control channel slot selector configured to select, for the control channel, one or more of the slots that are contiguous and unassigned subsequent to the channel slot selector selecting slots for the data channels.

5. The apparatus of claim 4, further comprising a clock frequency selector configured to pass a clock signal, over the clock line, related to a reference frequency $1/(2^N)$, where N being a range including zero and positive integers.

6. The apparatus of claim 4, wherein the data channel slot selector, in order to determine which condition, among the set of conditions, is met by the combination of the bucket quantity, the bucket length, the segment interval of the selected data channel, and the coefficient C of the equation by which the segment interval of the selected data channel is expressed and, in order to set, based on the condition that is determined, the target length and the target quantity, is further configured to
(1) set the target length equal to $(2^E)/(2^e)$, e being any positive integer or zero, and to set the target quantity equal to the segment interval divided by the target length, in response to the bucket length being greater than or equal to the segment interval concurrent with the coefficient C being greater than 1,
(2) set the target length equal to $(2^E)/(2^e)$, e being any positive integer, and set the target quantity equal to the segment interval divided by the target length, in response to the bucket length being greater than or equal to the segment interval concurrent with the coefficient C being equal to 1,
(3) set the target length equal to $(2^E)/(2^e)$, e being any positive integer or zero, and set the target quantity equal to the segment interval divided by the target length in response to the bucket length being less than the segment interval concurrent with being greater than or equal to $(2^E)$, and
(4) set the target length equal to the bucket length divided by $(2^e)$, e being any positive integer or zero, and setting the target quantity equal to the segment interval divided by the target length in response to the bucket length being less than the segment interval concurrent with being less than $(2^E)$.

7. The apparatus of claim 6, wherein the set of scenarios comprises a first scenario, a second scenario, a third scenario, a fourth scenario and a fifth scenario,
the first scenario comprises the target length being equal to the bucket length concurrent with the target quantity being equal to the bucket quantity,
the second scenario comprises the target length being equal to the bucket length and the target quantity being less than the bucket quantity,
the third scenario comprises the target length being equal to the bucket length concurrent with the target quantity being greater than the bucket quantity further concurrent with the target quantity being an integer multiple of the current bucket quantity,
the fourth scenario comprises the target length being equal to the bucket length, concurrent with the target quantity being not an integer multiple of the bucket quantity, and
the fifth scenario comprises the target length being less than the bucket length, and
wherein the data channel slot selector, in order to select, based on which scenario is determined as met, between changing and not changing the bucket length, and between changing and not changing the bucket quantity and, according to a result of the selecting, to change or not change the bucket length and the bucket quantity, is further configured to:
not change the bucket length and not change the bucket quantity in response to determining the first scenario,
reduce the bucket quantity to the target quantity in response to determining the second scenario,
increase the bucket quantity to the target quantity in response to determining the third scenario,
increase the bucket quantity to the target quantity in response to determining the fourth scenario, and increase or decrease the bucket quantity as necessary to equal the target quantity, and repeatedly halve the bucket length until the bucket length is equal to the target length in response to determining the fifth scenario.

8. An apparatus comprising:
a data line having slots and a given number of the slots per unit time configured to propagate a plurality of data channels, in a time division multiplexed (TDM) manner, each of the data channels in one or more of the slots that are contiguous, and to propagate a control channel in one or more of the slots that are contiguous, each of the data channels having a segment interval between successive instances of the data channel;
a clock line;
means for sorting data channels into an order for scheduling in the slots on the data line, the means for sorting being configured to express the segment intervals as $C*(2^E)$, C being a constant not divisible by 2, and to sort the data channels according to an increasing order or a decreasing order of the exponent E;
means for assigning each of the data channels, according to the order, to contiguous unassigned slots among the slots; and
means for assigning the control channel to the slots that are unassigned on the data line subsequent to the assigning the data channels,
the means for assigning each of the data channels being configured
to construct a plurality of buckets, each of the buckets referring to a group of contiguous slots on the data line, each of the buckets having a bucket length and a bucket quantity, the bucket length being a number of contiguous slots in a bucket, and the bucket quantity being a number of buckets in the segment interval, and
to repeat iterations of selecting, as a selected data channel, a data channel having a largest E, from among plurality of the data channels not yet assigned slots, and comprising
means for determining which condition, among a set of conditions, is met by a combination of the bucket quantity, the bucket length, the segment interval of the selected data channel, and the coefficient C of the equation by which the segment interval of the selected data channel is expressed and, based on the condition that is determined, set a target length and a target quantity for a conditional adjustment of the bucket length and of the bucket quantity,
means for assigning the selected data channel to contiguous unassigned slots among the slots, with the conditional adjustment of the bucket length and of the bucket quantity, comprising
means for determining which scenario is met by a relative state a relative state of the target length, the target quantity, the bucket length and the bucket quantity, among a given set of scenarios of said relative state,
means for selecting, based on which scenario is determined as met, between changing and not changing the bucket length, and between changing and not changing the bucket quantity and, according to a result of the selecting, to change or not change the bucket length and the bucket quantity, and means for placing the selected data channel at the end of the bucket with a greatest number of unassigned slots.

9. A non-transitory, tangible computer readable storage medium, encoded with processor readable instructions that, when executed by a processor, cause the processor to perform a method for scheduling data channels and a control channel on a time-division multiplexed single-line data bus configured to propagate a plurality of the data channels and the control channel in one or more of the slots that are contiguous, each of the data channels having a segment interval between successive instances of the data channel, the method comprising:

sorting the plurality of data channels into an order, the order being for scheduling in the slots, by expressing the segment interval of each data channel as $C*2^E$, C being a constant not divisible by 2, and sorting the data channels according to an increasing order or decreasing order of the exponent E;

constructing a plurality of buckets, each of the buckets referring to a group of contiguous slots on the data line, each of the buckets having a bucket length and a bucket quantity, the bucket length being a number of contiguous slots in a bucket, and the bucket quantity being a number of buckets in the segment interval, repeating iterations of selecting, as a selected data channel, a data channel having a largest E, from among plurality of the data channels not yet assigned slots and, for each selected data channel, determining which condition, among a set of conditions, is met by a combination of the bucket quantity, the bucket length, the segment interval of the selected data channel, and the coefficient C of the equation by which the segment interval of the selected data channel is expressed and, based on the condition that is determined, setting a target length and a target quantity for a conditional adjustment of the bucket length and of the bucket quantity, assigning the selected data channel to contiguous unassigned slots among the slots, with the conditional adjusting of the bucket length and of the bucket quantity, and assigning the control channel to slots on the data line that are contiguous and unassigned subsequent to assigning the data channels, wherein assigning the selected data channel, with the conditional adjusting the bucket length and the bucket quantity, comprises:

determining which scenario is met by a relative state a relative state of the target length, the target quantity, the bucket length and the bucket quantity, among a given set of scenarios of said relative state, selecting, based on which scenario is determined as met, between changing and not changing the bucket length, and between changing and not changing the bucket quantity and, according to a result of the selecting, changing or not changing the bucket length and the bucket quantity, and placing the selected data channel at the end of the bucket with a greatest number of unassigned slots.

10. A method of scheduling data channels and a control channel on a single-line data bus configured to propagate a plurality of the data channels and the control channel in slots, in a time-division multiplexing, each of the data channels having a segment interval between successive instances of the data channel having, the method comprising:

sorting two or more of the data channels into an ordered set of data channels, the sorting based on the respective segment intervals of the two or more data channels, and comprising expressing the segment intervals as $C*(2^E)$, C being a constant not divisible by 2, and sorting the data channels according to an increasing order or decreasing order of the exponent E;

constructing a plurality of buckets, each of the buckets referring to a group of contiguous slots on the data line, each of the buckets having a bucket length and a bucket quantity, the bucket length being a number of contiguous slots in a bucket, and the bucket quantity being a number of buckets in the segment interval, repeating iterations of selecting, as a selected data channel, a data channel having a largest E, from among the ordered set of data channels not yet assigned slots and, for each selected data channel, determining which condition, among a set of conditions, is met by a combination of the bucket quantity, the bucket length, the segment interval of the selected data channel, and the coefficient C of the equation by which the segment interval of the selected data channel is expressed and, based on the condition that is determined, set a target length and a target quantity for a conditional adjustment of the bucket length and of the bucket quantity, assigning the selected data channel to contiguous unassigned slots among the slots on the data line, with the conditional adjusting of the bucket length and the bucket quantity; and assigning the control channel to the slots that are unassigned on the data, wherein assigning the selected data channel to contiguous unassigned slots among the slots comprises determining which scenario is met by a relative state of the target length, the target quantity, the bucket length and the bucket quantity, among a given set of scenarios of said relative state, selecting, based on which scenario is determined as met, between changing and not changing the bucket length, and between changing and not changing the bucket quantity and, according to a result of the selecting, changing or not changing the bucket length and the bucket quantity, and placing the selected data channel at the end of the bucket with a greatest number of unassigned slots.

11. The method of claim 10, wherein determining which condition, among the set of conditions, is met by the combination of the bucket quantity, the bucket length, the segment interval of the selected data channel, and the coefficient C of the equation by which the segment interval of the selected data channel is expressed and, based on the condition that is determined, setting the target length and the target quantity comprises:

(1) in response to the bucket length being greater than or equal to the segment interval concurrent with, the coefficient C being greater than 1, setting the target length equal to $(2^E)/(2^e)$, e being any positive integer or zero, setting the target quantity equal to the segment interval divided by the target length;

(2) in response to the bucket length being greater than or equal to the segment interval concurrent with the coefficient C being equal to 1, setting the target length equal to $(2^E)/(2^e)$, e being any positive integer, and setting the target quantity equal to the segment interval divided by the target length;

(3) in response to the the bucket length being less than the segment interval concurrent with being greater than or equal to ($2^E$), setting the target length equal to ($2^E$)/($2^e$), e being any positive integer or zero, and setting the target quantity equal to the segment interval divided by the target length; and (4) in response to the bucket length being less than the segment interval concurrent with being less than ($2^E$), setting the target length equal to the bucket length divided by ($2^e$), e being any positive integer or zero, and setting the target quantity equal to the segment interval divided by the target length.

12. The method of claim 11, wherein the set of scenarios comprises a first scenario, a second scenario, a third scenario, a fourth scenario and a fifth scenario, the first scenario comprises the target length being equal to the bucket length concurrent with the target quantity being equal to the bucket quantity, the second scenario comprises the target length being equal to the bucket length and the target quantity being less than the bucket quantity;

the third scenario comprises the target length being equal to the bucket length concurrent with the target quantity being greater than the bucket quantity, further concurrent with the target quantity being an integer multiple of the current bucket quantity;

the fourth scenario comprises the target length being equal to the bucket length, concurrent with the target quantity being not an integer multiple of the bucket quantity, and the fifth scenario comprises the target length being less than the bucket length, and wherein selecting, based on which scenario is determined as met, between changing and not changing the bucket length, and between changing and not changing the bucket quantity and, according to a result of the selecting, changing or not changing the bucket length and the bucket quantity, comprises:

in response to determining the first scenario, not changing the bucket length and not changing the bucket quantity;

in response to determining the second scenario, reducing the bucket quantity to the target quantity;

in response to determining the third scenario, increasing the bucket quantity to the target quantity;

in response to determining the fourth scenario, increasing the bucket quantity to the target quantity; and in response to determining the fifth scenario, increasing or decreasing assigning the bucket as necessary to equal the target quantity, and repeatedly halving the bucket length until the bucket length is equal to the target length.

* * * * *